(12) United States Patent
Tokunaga et al.

(10) Patent No.: US 9,627,943 B2
(45) Date of Patent: Apr. 18, 2017

(54) MOTOR COOLING STRUCTURE AND MOTOR

(75) Inventors: Hiroyuki Tokunaga, Hiratsuka (JP);
Akira Okabe, Naka-gun (JP);
Kazuhiro Okamoto, Hitachinaka (JP);
Teiichirou Chiba, Hiratsuka (JP);
Natsuki Watanabe, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 136 days.

(21) Appl. No.: 13/818,122

(22) PCT Filed: Mar. 1, 2012

(86) PCT No.: PCT/JP2012/055193
§ 371 (c)(1),
(2), (4) Date: Feb. 21, 2013

(87) PCT Pub. No.: WO2012/118140
PCT Pub. Date: Sep. 7, 2012

(65) Prior Publication Data
US 2013/0334912 A1 Dec. 19, 2013

(30) Foreign Application Priority Data

Mar. 2, 2011 (JP) ................... 2011-045580

(51) Int. Cl.
*H02K 9/19* (2006.01)
*H02K 1/32* (2006.01)
(52) U.S. Cl.
CPC ................ *H02K 9/19* (2013.01); *H02K 1/32* (2013.01)
(58) Field of Classification Search
CPC ............. H02K 1/32; H02K 9/19; H02K 9/193
(Continued)

(56) References Cited

U.S. PATENT DOCUMENTS 4,429,924 A * 2/1984 Franz ................... H02K 5/1732
123/196 R
7,317,268 B2 1/2008 Bray et al.
(Continued)

FOREIGN PATENT DOCUMENTS

CN 1677809 A 10/2005
JP 09-182375 A 7/1997
(Continued)

OTHER PUBLICATIONS

Fukumaru et al., Machine Translation of JP11206063, Jul. 1999.*
(Continued)

*Primary Examiner* — Quyen Leung
*Assistant Examiner* — Eric Johnson
(74) *Attorney, Agent, or Firm* — Locke Lord LLP

(57) ABSTRACT

A motor cooling structure for cooling a motor, which includes a shaft transmitting power and a rotor core attached to an outside of the shaft, by a cooling medium, includes: a cooling medium supply passage that extends to an inside of the shaft in an axial direction of the shaft and passes the cooling medium through the cooling medium supply passage; and a plurality of cooling medium passages that are branched from the cooling medium supply passage to cool the rotor core while flowing the cooling medium without branching the cooling medium in the axial direction and then eject the cooling medium from a plurality of ejection holes opened to a surface of the rotor core, wherein distances from a cooling medium inlet, through which the cooling medium flows into the cooling medium supply passage, to the respective ejection holes are equal between the plurality of cooling medium passages.

15 Claims, 14 Drawing Sheets

(58) Field of Classification Search
USPC .................................... 310/59, 61, 60 A, 54
See application file for complete search history.

(56) References Cited

U.S. PATENT DOCUMENTS

| | | | |
|---|---|---|---|
| 7,456,536 B2* | 11/2008 | Tanaka et al. | .................. 310/90 |
| 2005/0218752 A1 | 10/2005 | Bray et al. | |
| 2007/0273228 A1* | 11/2007 | Tanaka et al. | .................. 310/90 |

FOREIGN PATENT DOCUMENTS

| | | | | | |
|---|---|---|---|---|---|
| JP | 11206063 A | * | 7/1999 | ............... | H02K 5/20 |
| JP | 2003-324901 A | | 11/2003 | | |
| JP | 2005006428 A | * | 1/2005 | ............... | H02K 9/18 |
| JP | 2005006429 A | * | 1/2005 | ............... | H02K 9/19 |
| JP | 2009-027800 A | | 2/2009 | | |
| JP | 2009-081953 A | | 4/2009 | | |
| JP | 2009232557 A | * | 10/2009 | | |
| JP | 2010220340 A | * | 9/2010 | | |

OTHER PUBLICATIONS

Hattori et al., Machine Translation of JP2005006428, Jan. 2005.*
Suzuura et al., Machine Translation of JP2009232557,Oct. 2009.*
Endo et al.,Machine Translation of JP2010220340,Sep. 2010.*
International Search Report dated Apr. 24, 2012, issued for PCT/JP2012/055193.

* cited by examiner

A-A

B-B

E-E

A-A

B-B

MOTOR COOLING STRUCTURE AND MOTOR

FIELD

The present invention relates to a motor cooling structure that cools a motor by oil, and a motor.

BACKGROUND

A motor is used in various applications, but generates heat by Joule heating of a coil included in a stator, an eddy current loss and a hysteresis loss generated in a rotor core, or the like. In particular, when the power output of a motor increases, the current supplied to the motor also increases accordingly, so that the heat generation of the motor also increases. When the heat generation amount of the motor increases, since the performance of the motor degrades, the motor needs to be cooled. For example, Patent Literature 1 discloses a technology for cooling a motor by using a cooling medium such as oil.

CITATION LIST

Patent Literature

Patent Literature 1: Japanese Patent Application Laid-open No. 9-182375

SUMMARY

Technical Problem

A motor cooling circuit disclosed in Patent Literature 1 flows oil as a cooling medium from an axial oil passage of a rotor shaft to a plurality of radial oil passages and a plurality of axial oil passages of a core. In the motor cooling circuit disclosed in Patent Literature 1, since the distances from an inlet of the axial oil passage of the rotor shaft to inlets of the respective radial oil passages are different, the flow rates of oil flowing through the respective radial oil passages and the rotor axial oil passage may become non-uniform and thus the cooling variation of a cooling target such as a rotor, a stator coil, and the like may increase. An object of the present invention is to suppress a cooling variation of a cooling target when cooling a motor by a cooling medium.

Solution to Problem

To achieve the object mentioned above, according to the present invention, a motor cooling structure for cooling a motor, which includes a shaft transmitting power and a rotor core attached to an outside of the shaft, by a cooling medium, comprises: a cooling medium supply passage that extends to an inside of the shaft in an axial direction of the shaft and passes the cooling medium through the cooling medium supply passage; and a plurality of cooling medium passages that are branched from the cooling medium supply passage to cool the rotor core while flowing the cooling medium without branching the cooling medium in the axial direction and then eject the cooling medium from a plurality of ejection holes opened to a surface of the rotor core, wherein distances from a cooling medium inlet, through which the cooling medium flows into the cooling medium supply passage, to the respective ejection holes are equal between the plurality of cooling medium passages.

As a preferred aspect of the present invention, it is preferable that the ejection holes are opened to both end portions of the rotor core.

As a preferred aspect of the present invention, it is preferable that an even number of the cooling medium passages are branched from the cooling medium supply passage.

As a preferred aspect of the present invention, it is preferable that a position at which each of the plurality of cooling medium passages is branched from the cooling medium supply passage is a central portion of the rotor core in the axial direction.

As a preferred aspect of the present invention, it is preferable that the plurality of cooling medium passages have an equal dimension and shape in a case where the cooling medium passages are cut along a plane that is parallel to a flow direction of the cooling medium.

As a preferred aspect of the present invention, it is preferable that the shaft includes a surface including a groove that extends in the axial direction, and a part of the cooling medium passage is formed between the groove and the rotor core.

As a preferred aspect of the present invention, it is preferable that the rotor core includes a through hole that passes through in the axial direction, and the groove and the through hole are connected at an end portion of the rotor core.

As a preferred aspect of the present invention, it is preferable that the rotor core includes a magnet holding hole that passes through in the axial direction and holds a magnet.

As a preferred aspect of the present invention, it is preferable that the balance plate, which is provided at an end portion of the rotor core includes a connection portion that connects the groove and the through hole.

As a preferred aspect of the present invention, it is preferable that each of the plurality of cooling medium passages includes: a first cooling medium passage that is branched from the cooling medium supply passage to an outer side of the shaft in a radial direction; a second cooling medium passage that is connected to the first cooling medium passage and extends in the axial direction; and the connection portion that is connected to the second cooling medium passage.

As a preferred aspect of the present invention, it is preferable that a housing that stores the shaft, to which the rotor core is attached, and a stator disposed at an outside of the rotor core includes a coil end cooling passage at a portion facing a coil end of a coil included in the stator.

As a preferred aspect of the present invention, it is preferable that the shaft includes two bearings that rotatably support the shaft, and the cooling medium passage includes: a first cooling medium ejection passage that is opened to a side of one end of the shaft than one of the bearings of a surface of the shaft; and a second cooling medium ejection passage that is opened to a side of the other end of the shaft than the other of the bearing of the surface of the shaft.

According to the present invention, a motor cooling structure for cooling a motor, which includes a shaft transmitting power and a rotor core attached to an outside of the shaft, by a cooling medium, comprises: a cooling medium supply passage that extends to an inside of the shaft in an axial direction of the shaft; and a plurality of cooling medium passages, wherein each of the cooling medium passages includes: a first cooling medium passage that extends from the cooling medium supply passage to an outer side of the shaft in a radial direction at a position corresponding to a central portion of the rotor core in the axial direction, and is perpendicular to the cooling medium supply passage; a second cooling medium passage that is formed by a space surrounded by the rotor core and a groove formed at a surface of the shaft and extending in the axial direction, wherein the space is connected to the first cooling medium passage; a third cooling medium passage that is provided in a balance plate installed at an end portion of the rotor core and is connected to the second cooling medium passage; a fourth cooling medium passage that passes through the rotor core in the axial direction and is connected to the third cooling medium passage; and an ejection hole to which the fourth cooling medium passage is opened at an end portion of the rotor core, wherein a distance from a cooling medium inlet, through which the cooling medium flows into the cooling medium supply passage, to the ejection hole of the cooling medium passage opened to one end portion of the rotor core is equal to a distance from the cooling medium inlet, through which the cooling medium flows into the cooling medium supply passage, to the ejection hole of the cooling medium passage opened to the other end portion of the rotor core.

According to the present invention, a motor comprising the motor cooling structure.

Advantageous Effects of Invention

The present invention can suppress a cooling variation of a cooling target when cooling a motor by a cooling medium.

DESCRIPTION OF EMBODIMENTS

Modes (embodiments) for implementing the present invention will be described in detail with reference to the drawings. The present invention is not limited by the contents described in the following embodiments. Also, the components described below include substantially equivalent ones that can be easily conceived by those skilled in the art. In addition, the components described below can be combined appropriately.

A motor generates heat by Joule heating of a coil included in a stator, an eddy current loss and a hysteresis loss of a rotor core, or the like. A motor cooling structure according to the present embodiment (hereinafter referred to as a cooling structure if necessary) is configured such that the pressure losses of a plurality of cooling medium passages, which are branched from a cooling medium supply passage provided in a shaft of a motor to flow a cooling medium therethrough and eject the cooling medium from a surface of a rotor core with a plurality of stacked steel plates, are equalized (including a tolerance and a manufacturing error), taking into account a centrifugal force caused by the rotation of the shaft and the rotor core. By this configuration, the cooling structure according to the present embodiment cools the rotor core, a magnet, and a coil (specifically, a coil end) by using the cooling medium. Next, a configuration of a motor including the cooling structure according to the present embodiment will be described. The motor according to the present embodiment includes the above cooling structure. The cooling structure and the motor according to the present embodiment are suitable for a construction vehicle. First, a wheel loader will be described as an example of the construction vehicle that uses the motor according to the present embodiment.

<Wheel Loader>

Figure 1:
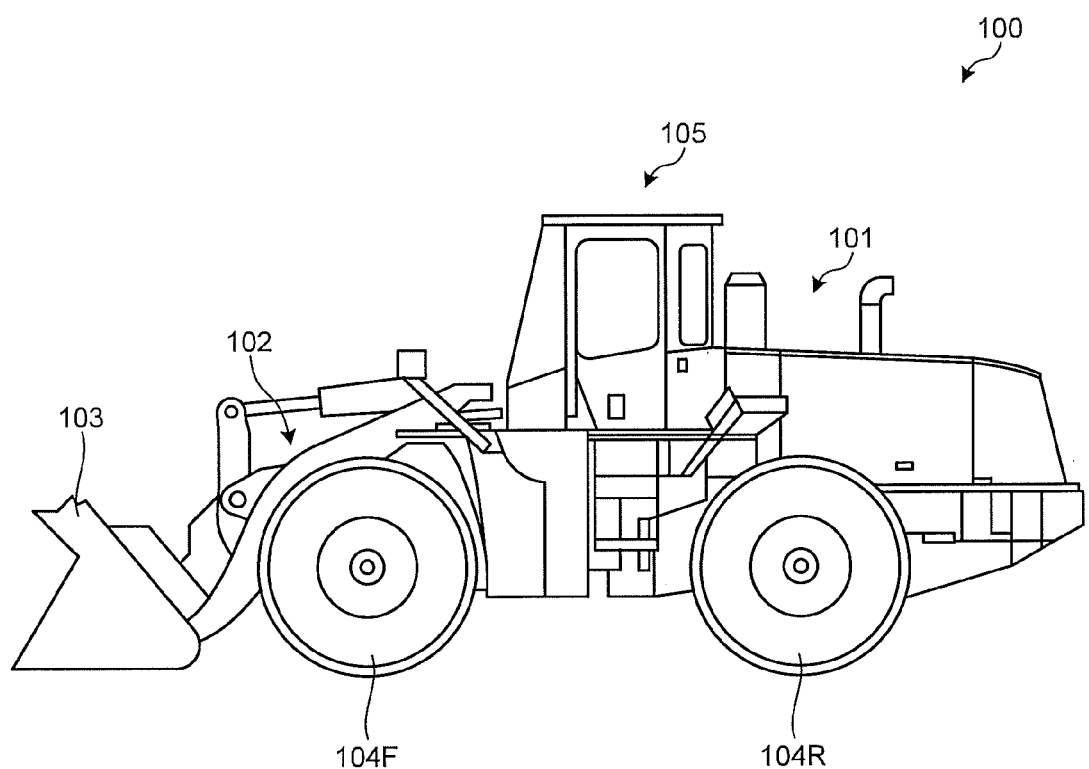
FIG. 1 is an explanatory diagram illustrating a wheel loader.

FIG. 1 is an explanatory diagram illustrating a wheel loader. A wheel loader 100 includes a vehicle body 101, a lift arm (operation machine) 102 installed at a front portion of the vehicle body 101, a bucket (operation machine) 103 installed at a front end of the lift arm 102, two front wheels 104F and two rear wheels 104R driving the vehicle body 101 by rotating while supporting the vehicle body 101, and a cab 105 mounted on top of the vehicle body 101.

Figure 2:
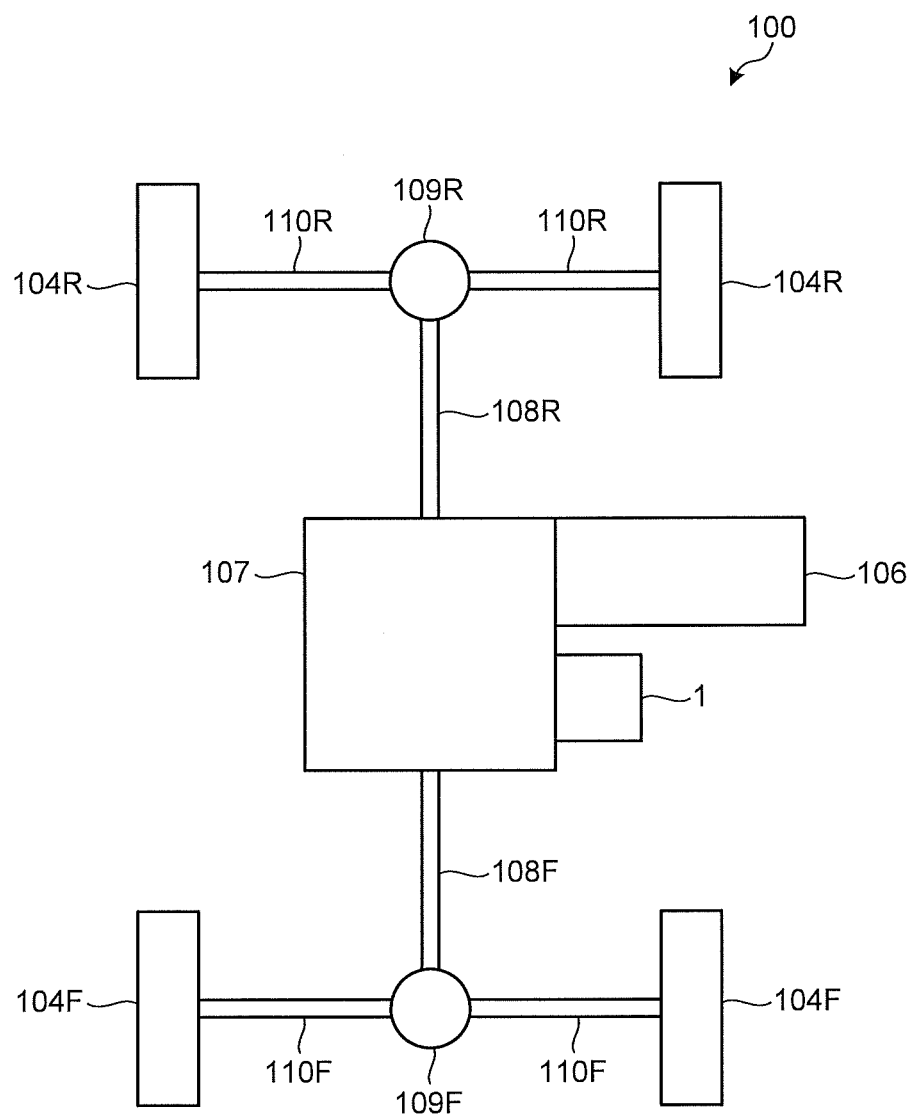
FIG. 2 is a pattern diagram illustrating a drive system of the wheel loader.

FIG. 2 is a pattern diagram illustrating a drive system of the wheel loader. In the present embodiment, the wheel loader 100 includes, as a power source, an internal combustion engine 106 such as a gasoline engine or a diesel engine, and a motor 1. In this manner, a drive mode of the wheel loader 100 is a so-called hybrid mode. In the present embodiment, the wheel loader 100 includes the internal combustion engine 106 and the motor 1. The power outputs of the internal combustion engine 106 and the motor 1 are input to a transmission 107. The transmission 107 combines the power outputs of the internal combustion engine 106 and the motor 1 and outputs the result to a front wheel propeller shaft 108F and a rear wheel propeller shaft 108R. The output of the front wheel propeller shaft 108F is transmitted to the two front wheels 104F through a front wheel differential gear 109F and a front wheel drive shaft 110F. Also, the output of the rear wheel propeller shaft 108R is transmitted to the two rear wheels 104R through a rear wheel differential gear 109R and a rear wheel drive shaft 110R. In this manner, the power outputs of the internal combustion engine 106 and the motor 1 are transmitted to the front wheels 104F and the rear wheels 104R to drive the wheel loader 100. There is also a case where only the power output of the motor 1 or only the power output of the internal combustion engine 106 is transmitted to the transmission 107 during the operation of the wheel loader 100. That is, during the operation of the wheel loader 100, the power output of the motor 1 and the power output of the internal combustion engine 106 are not always transmitted to the transmission 107. Also, the wheel loader 100 may include one or more motors 1. In addition, the wheel loader 100 includes an inverter that controls an operation (powering or regeneration) of the motor 1, and an electric storage device such as a capacitor or a secondary battery that stores energy (power) obtained by the regeneration of the motor 1. Also, in the present embodiment, the wheel loader 100 may be an electric vehicle (construction vehicle) that drives the motor 1 by the power of an electric storage device without using an internal combustion engine. That is, the cooling structure according to the present embodiment can be applied to either a hybrid vehicle or an electric vehicle.

In the present embodiment, the motor 1 and the internal combustion engine 106 are disposed transversely. That is, the power transmission shafts of the motor 1 and the internal combustion engine 106 are disposed to be perpendicular to the traveling direction of the wheel loader 100 in a straight-ahead mode. More specifically, the power transmission shafts of the motor 1 and the internal combustion engine 106 are disposed to be perpendicular to the front wheel propeller shaft 108F and the rear wheel propeller shaft 108R. In addition, the motor 1 and the internal combustion engine 106 are not limited to being disposed transversely, but may be disposed longitudinally. That is, the power transmission shafts of the motor 1 and the internal combustion engine 106 may be disposed in parallel to the front wheel propeller shaft 108F and the rear wheel propeller shaft 108R. Next, the cooling structure and the motor according to the present embodiment will be described.

<Cooling Structure and Motor>

Figure 3:
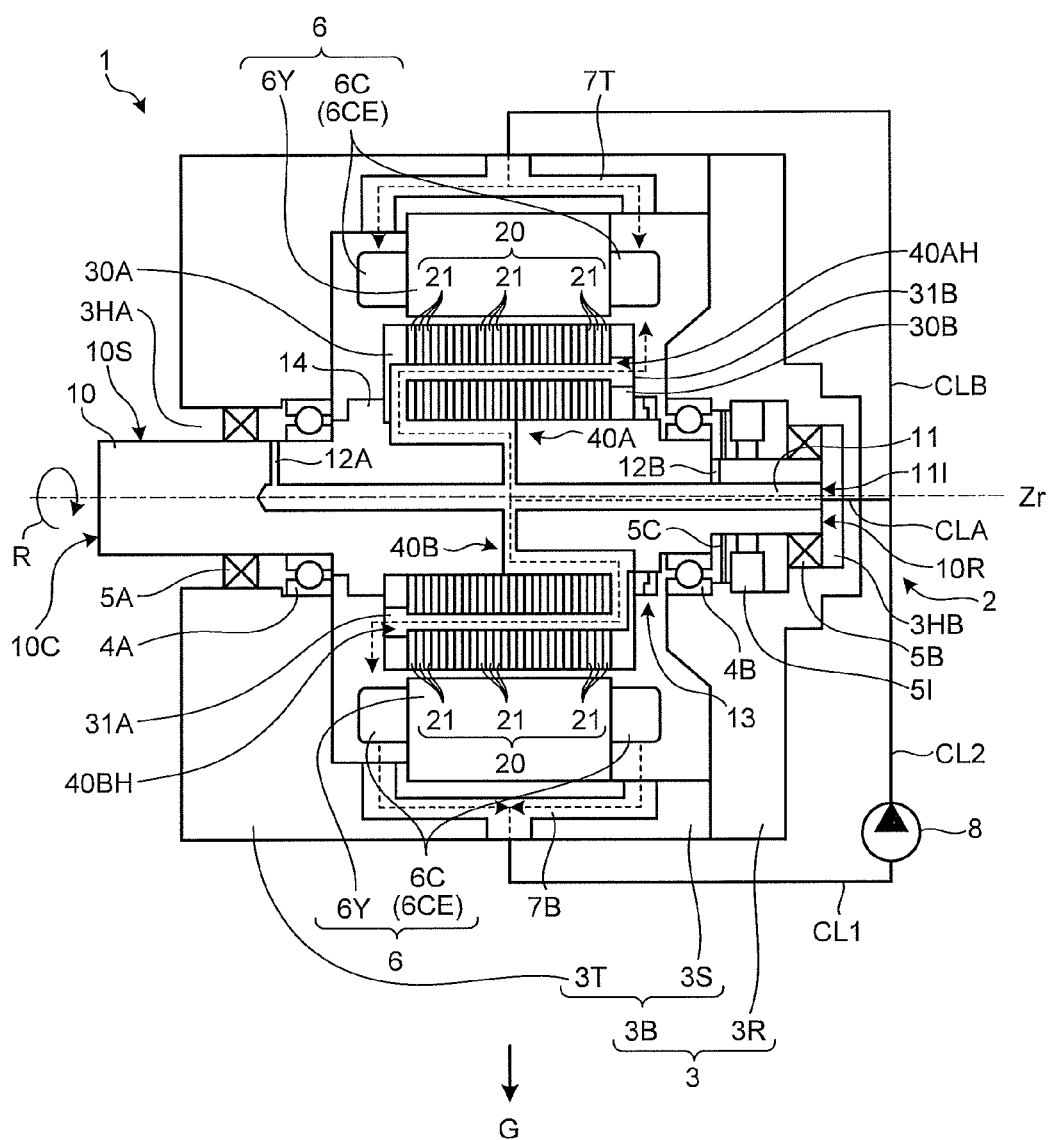
FIG. 3 is a cross-sectional view illustrating a motor cooling structure and a motor including the motor cooling structure according to the present embodiment.

FIG. 3 is a cross-sectional view illustrating a motor cooling structure and a motor including the motor cooling structure according to the present embodiment. The motor 1 includes a cooling structure 2, a housing 3, a shaft 10 as a power transmission shaft, a rotor core 20, and a stator 6. The shaft 10 outputs the power generated by the motor 1 to the outside of the motor 1, and inputs power to the motor 1 when the motor 1 is used as a generator. The rotor core 20 is attached to the outer periphery of the shaft 10. The rotor core 20 is a cylindrical structure that includes stacked disk-shaped steel plates (electromagnetic steel plates) 21. At the outside of the rotor core 20, the stator 6 is disposed. The stator 6 is disposed at the outside of the rotor core 20. In the present embodiment, the rotor core 20 includes a plurality of embedded permanent magnets, which will be described below. In this manner, in the present embodiment, the motor 1 includes an IPM (Interior Permanent Magnet), but may include an SPM (Surface Permanent Magnet). The stator 6 is a structure including a stator core 6Y and a coil 6C, and the coil 6C is wound around the stator core 6Y. A portion protruding from the stator core 6Y of the coil 6C is a coil end 6CE. The stator core 6Y is a structure that includes a plurality of stacked steel plates (electromagnetic steel plates). Also, the motor 1 may be a motor without a permanent magnet, for example, an induction motor or the like. That is, the cooling structure 2 can be applied regardless of whether the motor 1 includes a magnet.

The housing 3 stores the shaft 10 and the stator 6 to which the rotor core 20 is attached. The housing 3 includes a shaft extraction side member 3T, a cylindrical side portion 3S, and a cylindrical opposite shaft extraction side member 3R. The space surrounded by the shaft extraction side member 3T, the cylindrical side portion 3S, and the opposite shaft extraction side member 3R is the inside of the housing 3. The shaft extraction side member 3T includes a through hole 3HA for extracting the shaft 10 to the outside of the housing 3. The shaft 10 stored in the housing 3 is extracted through the through hole 3HA. In the present embodiment, the shaft extraction side member 3T and the side portion 3S may be integratedly formed by, for example, casting or the like, but may be separately formed and connected by a fastening member such as screws. The opposite shaft extraction side member 3R is attached to the side portion 3S in the opposite side to the shaft extraction side member 3T. The opposite shaft extraction side member 3R is attached to the side portion 3S by a fastening member such as screws.

The stator 6 is attached to the inner periphery of the side portion 3S of the housing 3. The stator 6 is an annular structure, and is attached around the entire inner periphery of the side portion 3S. The rotor core 20 to which the shaft 10 is attached is disposed at the inner periphery side of the stator 6. Bearings 4A and 4B are attached to both sides of the shaft 10. The two bearings 4A and 4B are attached to the housing 3, and rotatably support the shaft 10. More specifically, the bearing 4A is attached to the shaft extraction side member 3T, and the bearing 4B is attached to the opposite shaft extraction side member 3R. By this configuration, the housing 3 rotatably supports the shaft 10 by the bearings 4A and 4B. The shaft 10 rotates around a central rotation axis Zr.

One end portion 10C of the shaft 10 protrudes from the through hole 3HA of the shaft extraction side member 3T. For example, a gear, a joint, or the like is attached to the one end portion 10C side of the shaft 10. By this configuration, the power of the motor 1 is extracted from the shaft 10 through the gear, the joint, or the like, or power is input to the motor 1 to generate power from the motor 1. The one end portion 10C of the shaft 10 is an input/output side of the shaft 10.

Sealing members 5A and 5B are provided between the shaft 10 and the housing 3. Also, a rotation number sensor 51 detecting the rotation number of the shaft 10 is provided between the shaft 10 and the housing 3. Also, the rotation number sensor 51 is disposed between the bearing 4B and the sealing member 5B. The sealing member 5A is located in the through hole 3HA of the shaft extraction side member 3T, and is attached between the bearing 4A and the one end portion 10C of the shaft 10. A sealing member 4b is disposed at the other end portion 10R side of the shaft 10 than the bearing 4B, and is attached to the opposite shaft extraction side member 3R. In the present embodiment, the inside of the motor 1 is cooled by a cooling medium (for example, oil) and simultaneously the bearings 4A and 4B are lubricated. Therefore, in order to suppress the cooling medium from leaking from the shaft 10 to the outside of the housing 3, the sealing members 5A and 5B are provided between the housing 3 and the shaft 10. Also, an oil seal 5C as a sealing member is provided between the bearing 4B and the sealing member 5B.

The rotor core 20 is a structure including a plurality of steel plates 21 that are stacked and attached to the shaft 10. When the plurality of steel plates 21 is in a state of being attached to the shaft 10, the stacking direction of the plurality of steel plates 21 is parallel to the axial direction of the shaft 10, that is, the central rotation axis Zr. Balance plates 30A and 30B are provided at both end portions of the rotor core 20 in the stacking direction. Also, the balance plates 30A and 30B are annular members, and are attached to the outer periphery of the shaft 10. The rotor core 20 including the plurality of stacked steel plates 21 is sandwiched between the two balance plates 30A and 30B. In one side of the balance plate 30A, the shaft 10 includes a rotor core fixing portion 14 that has an outer diameter larger than the inner diameter of the balance plate 30A. Therefore, the balance plate 30A attached to the shaft 10 from the other end portion 10R side of the shaft 10 is restricted from being further moved when contacting the rotor core fixing portion 14. The balance plate 30A, the rotor core 20, and the balance plate 30B are attached to the shaft 10 in the order named, and a rotor core fixing nut 13 is screwed into the shaft 10, so that the rotor core 20 is attached to the shaft 10. In this state, the balance plates 30A and 30B applies a compressive force to the rotor core 20, that is, the plurality of stacked steel plates 21. The diameter of the balance plates 30A and 30B is equal to or smaller than the diameter of the steel plates 21.

The shaft 10 includes a cooling medium supply passage 11 for passing a cooling medium for cooling the inside of the motor 1. In the present embodiment, the cooling medium supply passage 11 is provided along the central rotation axis Zr. It is preferable that the cooling medium supply passage 11 is provided on the central rotation axis Zr. Also, the shaft 10 may be a hollow shaft, and an additional shaft may be provided to pass through the shaft 10. In this case, the space formed between the shaft 10 and the additional shaft 10 passing through the shaft 10 may be the cooling medium supply passage 11. The cooling medium supply passage 11 is located inside the shaft 10, and extends from the other end portion 10R in the axial direction of the shaft 10, that is, the central rotation axis Zr direction. Therefore, the other end portion 10R of the shaft 10 is provided with a cooling medium inlet 11I through which a cooling medium flows into the cooling medium supply passage 11. In this manner, the other end portion 10R of the shaft 10 is the cooling medium inlet side.

In the present embodiment, the cooling medium supply passage 11 is provided partway toward the axial direction of the shaft 10. The cooling medium supply passage 11 includes cooling medium ejection passages 12A and 12B that extend toward the radial outside of the shaft 10. The cooling medium ejection passages 12A and 12B are opened to the cooling medium supply passage 11. The cooling medium ejection passage (first cooling medium ejection passage) 12A is located at a surface 10S of the shaft 10, and is opened to the one end portion 10C side of the shaft 10 than the one side bearing 4A. The cooling medium ejection passage (second cooling medium ejection passage) 12B is located at the surface 10S of the shaft 10, and is opened to the other end portion 10R side of the shaft 10 than the other side bearing 4B. By this configuration, the cooling medium ejection passages 12A and 12B communicate with the cooling medium supply passage 11 and the surface 10S of the shaft 10. The cooling medium supplied to the cooling medium supply passage 11 is ejected from the cooling medium ejection passages 12A and 12B, and cools and lubricates the bearings 4A and 4B while flowing through a cooling medium recovery passage 7B to be described below. Also, the motor 1 may not necessarily include the cooling medium ejection passages 12A and 12B.

A plurality of cooling medium passages 40A and 40B are branched from the cooling medium supply passage 11. Also, FIG. 3 illustrates a cross-sectional surface in the case where the shaft 10 is cut along a plane that is parallel to the central rotation axis Zr of the shaft 10 and includes the central rotation axis Zr. However, for the convenience of description, the plurality of cooling medium passages 40A and 40B are shown on the same cross-sectional surface. However, in actuality, as will be described below, the cooling medium passages 40A are shown on the respective cross-sectional surfaces in the case where the shaft 10 is cut along planes that have 90 degrees different center angles around the central rotation axis Zr.

The plurality of cooling medium passages 40A and 40B, which are branched from the cooling medium supply passage 11, cools the rotor core 20 while flowing a cooling medium in one direction without branching the cooling medium with respect to the axial direction of the shaft 10, and then ejects the cooling medium from ejection holes 40AH and 40BH that are opened to the surface of the rotor core 20. The plurality of cooling medium passages 40A and 40B have the same distance (passage distance) from the cooling medium inlet 11I, through which the cooling medium flows into the cooling medium supply passage 11, to the ejection holes 40AH and 40BH. The cooling medium passages 40A and 40B will be described later in detail. The cooling medium ejected from the ejection holes 40AH and 40BH flows into the inside of the housing 3 from cooling medium outlets 31B and 31A included in the balance plates 30B and 30A. When the rotor core 20 is rotated, the cooling medium flowed from the cooling medium outlets 31B and 31A is blown to the radial outside of the rotor core 20 by a centrifugal force caused by the rotation. The cooling medium blown to the radial outside of the rotor core 20 cools the coil end 6CE.

The cooling medium recovery passage 7B is provided at the side portion 3S of the housing 3. When the motor 1 is in use, the cooling medium recovery passage 7B is provided at a downward side (which is a gravity direction side and is a direction side indicated by an arrow G in FIG. 3). For example, when the motor 1 is mounted on the wheel loader 100 illustrated in FIG. 1, the state of the wheel loader 100 being grounded to a horizontal plane is referred to as the state of the motor 1 being used. In this state, the cooling medium recovery passage 7B is provided at a position in the downward side.

In the present embodiment, the housing 3 includes a coil end cooling passage 7T at a portion that faces the coil end 6CE and is out of the cooling medium recovery passage 7B. A cooling medium is also supplied from the coil end cooling passage 7T to the coil end 6CE to cool the coil end 6CE. Also, the coil end cooling passage 7T need not necessarily be provided. For example, whether to provide the coil end cooling passage 7T in the housing 3 is determined according to the specifications of the motor 1, a mounting target of the motor 1, or the like, or according to the operation conditions. When the motor 1 is disposed such that the central rotation axis Zr of the shaft 10 is perpendicular to the vertical direction (the gravity direction), it is preferable that the coil end cooling passage 7T is disposed at the upward side (the opposite side to the vertical direction). In this case, it is more preferable that the coil end cooling passage 7T is disposed at the uppermost side (that is, the top side).

In the present embodiment, the cooling medium is supplied to the motor 1 by a pump 8 as a cooling medium circulation means, and is suctioned by the pump 8 after cooling the motor 1. A suction port of the pump 8 is connected to the cooling medium recovery passage 7B by a first cooling medium pipe CL1. Also, a discharge port of the pump 8 is connected to the motor 1 by a second cooling medium pipe CL2. In the present embodiment, the second cooling medium pipe CL2 is branched into a shaft side supply pipe CLA and a coil end side supply pipe CLB. The former is connected to the cooling medium inlet 11I of the cooling medium supply passage 11, and the latter is connected to the coil end cooling passage 7T, so that the cooling medium discharged from the pump 8 is supplied to the respective connection targets.

In the present embodiment, the cooling structure 2 includes the cooling medium supply passage 11 and the plurality of cooling medium passages 40A and 40B. A portion of the cooling medium discharged from the pump 8 flows through the second cooling medium pipe CL2 into the shaft side supply pipe CLA, and the other flows into the coil end side supply pipe CLB. The cooling medium flowing into the shaft side supply pipe CLA flows through the cooling medium inlet 11I, and then a portion thereof flows into the respective cooling medium passages 40A and 40B. The cooling medium cools the rotor core 20 while passing through the cooling medium passages 40A and 40B, and is ejected from the ejection holes 40AH and 40BH into the housing 3. The cooling medium ejected into the housing 3 reaches the coil end 6CE by the centrifugal force of the rotor core 20 and cools the coil end 6CE. The cooling medium not flowing into the cooling medium passages 40A and 40B is ejected from the cooling medium ejection passages 12A and 12B to cool and lubricate the bearings 4A and 4B. The cooling medium flowing through the coil end side supply pipe CLB flows into the coil end cooling passage 7T and then is supplied to the coil end 6CE to cool the coil end 6CE. Even when the motor 1 is operated under the condition that the coil end 6CE is apt to be insufficiently cooled by the cooling medium flowed from the cooling medium outlets 31B and 31A, the coil end 6CE can be cooled by the coil end cooling passage 7T. Therefore, the coil end cooling passage 7T can stably operate the motor 1 in various operation conditions.

The cooling medium having cooled the coil end 6CE and the cooling medium having cooled and lubricated the bearings 4A and 4B flow downward of the housing 3 by the action of gravity. This cooling medium is discharged through the cooling medium recovery passage 7B to the outside of the housing 3. The cooling medium discharged to the outside of the housing 3 is suctioned though the pump 8 into the first cooling medium pipe CL1. The pump 8 discharges the suctioned cooling medium to the second cooling medium pipe CL2. In this manner, in the cooling structure 2, the pump 8 is used to circulate the cooling medium between the motor 1, the first cooling medium pipe CL1, the second cooling medium pipe CL2, the shaft side supply pipe CLA, and the coil end side supply pipe CLB. The cooling structure 2 repeats the cooling of the rotor core 20 and the coil end 6CE and the lubricating and cooling of the bearings 4A and 4B, which have been described above. Also, the first cooling medium pipe CL1 and the second cooling medium pipe CL2 may be provided with a filter for removing foreign substances from the cooling medium, and a cooler for cooling the heated-up cooling medium by cooling the rotor core 20 and the coil end 6CE. Also, as means for supplying the cooling medium to the coil end cooling passage 7T, in addition to the above-described cooling medium circulation structure, an additional cooling medium supply pump different from the pump 8 may be provided to supply the cooling medium to the coil end cooling passage 7T. That is, the motor 1 may include a cooling circuit dedicated to the coil end cooling passage 7T. Next, the components of the motor 1 will be described in more detail.

<Shaft and Rotor Core>

Figure 4:
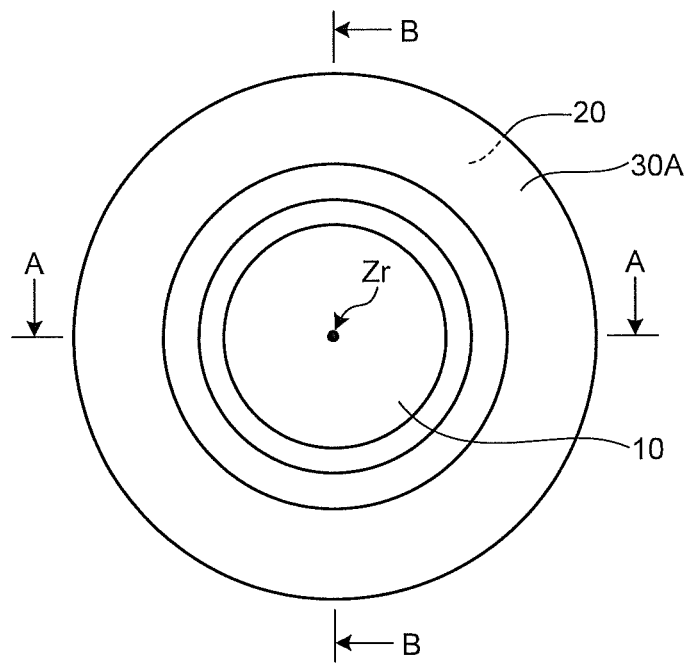
FIG. 4 is a front view of a shaft and a rotor core included in the motor according to the present embodiment, when viewed from an input/output side of the shaft.
Figure 5:
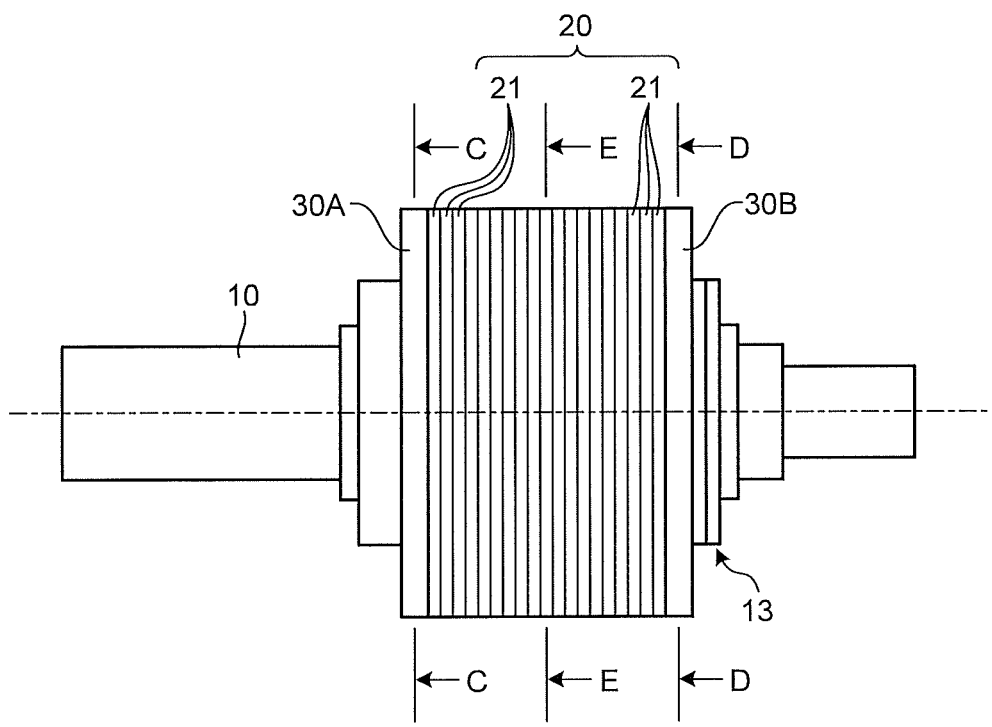
FIG. 5 is a side view of the shaft and the rotor core included in the motor according to the present embodiment.
Figure 6:
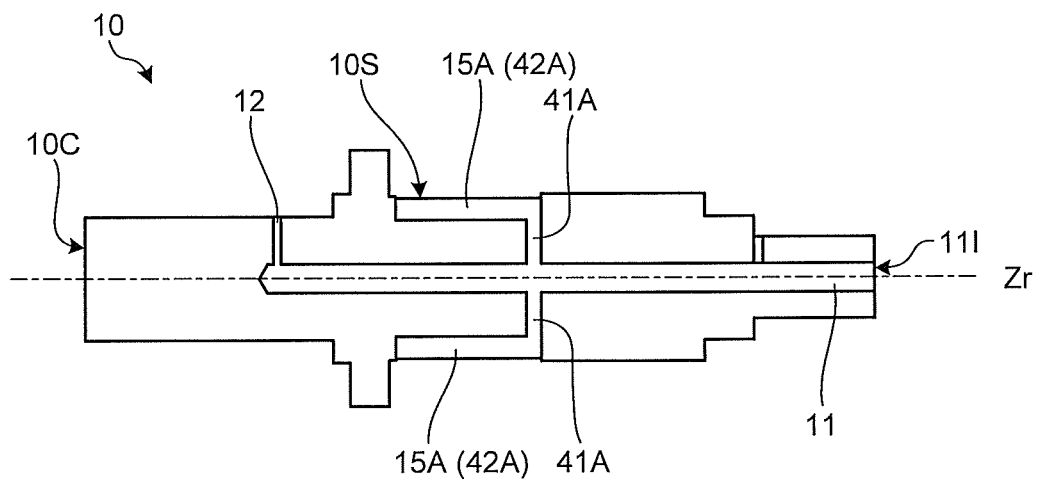
FIG. 6 is an A-A arrow view of FIG. 4.
Figure 7:
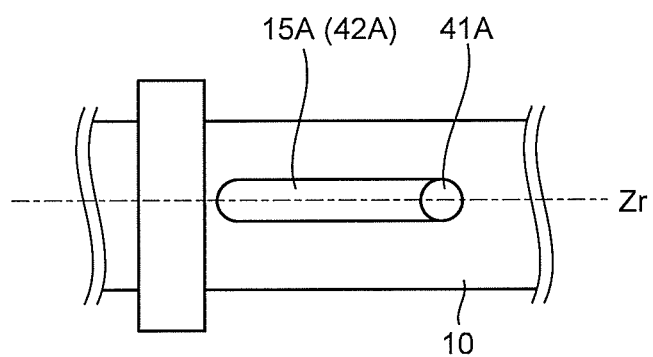
FIG. 7 is an enlarged view of a groove illustrated in FIG. 6.
Figure 8:
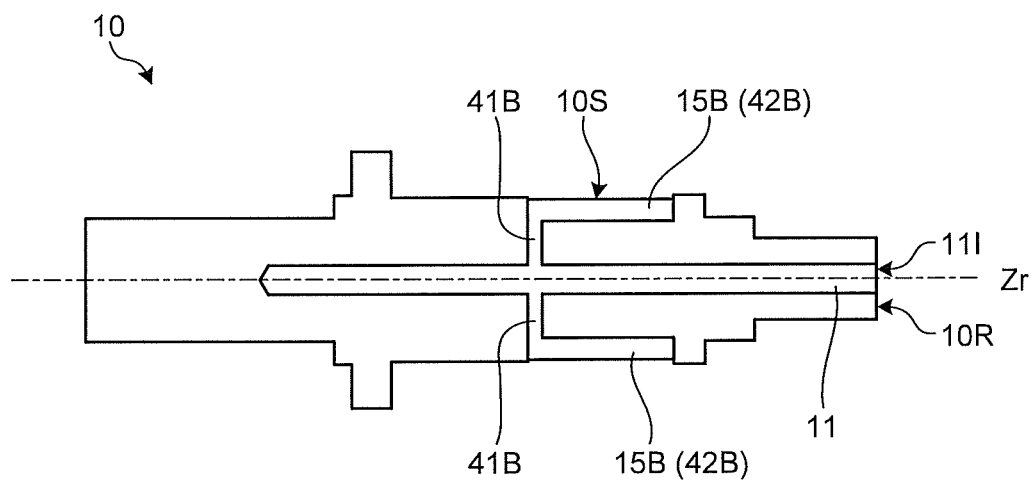
FIG. 8 is a B-B arrow view of FIG. 4.
Figure 9:
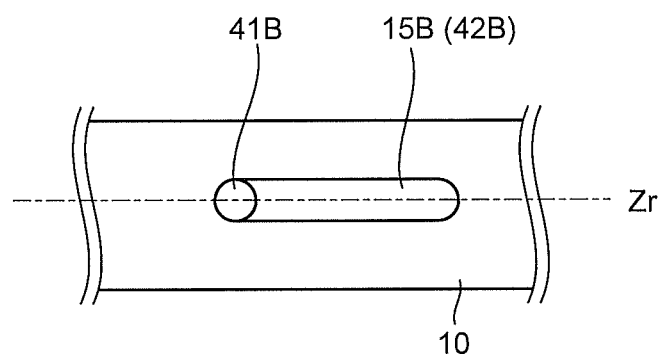
FIG. 9 is an enlarged view of a groove illustrated in FIG. 8.
Figure 10:
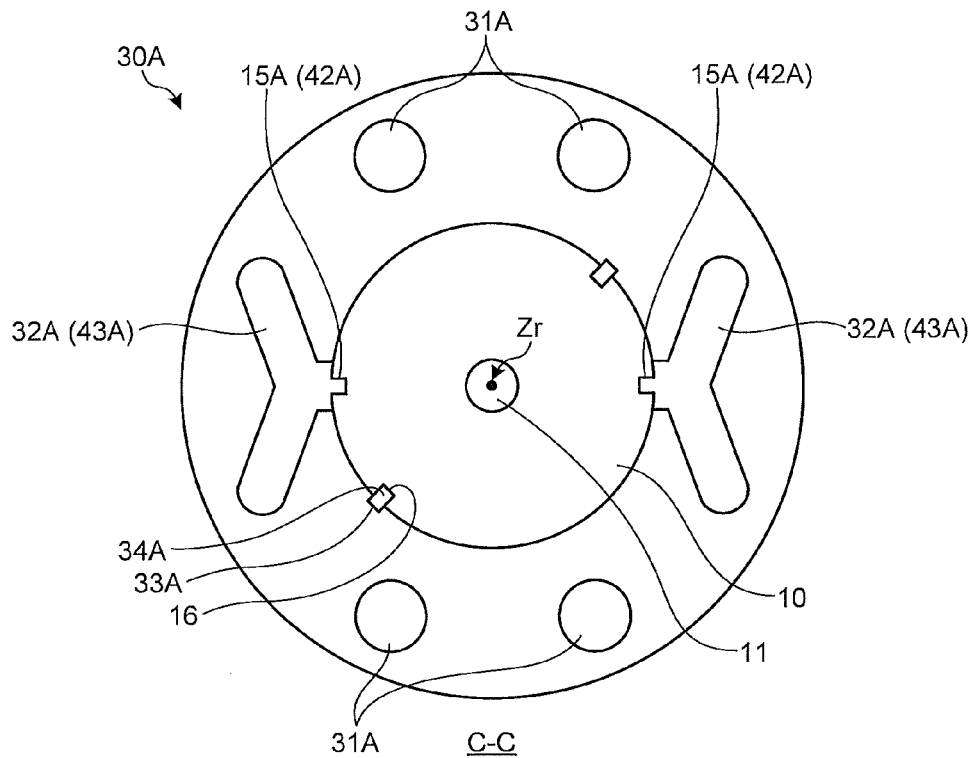
FIG. 10 is a C-C arrow view of FIG. 5.
Figure 11:
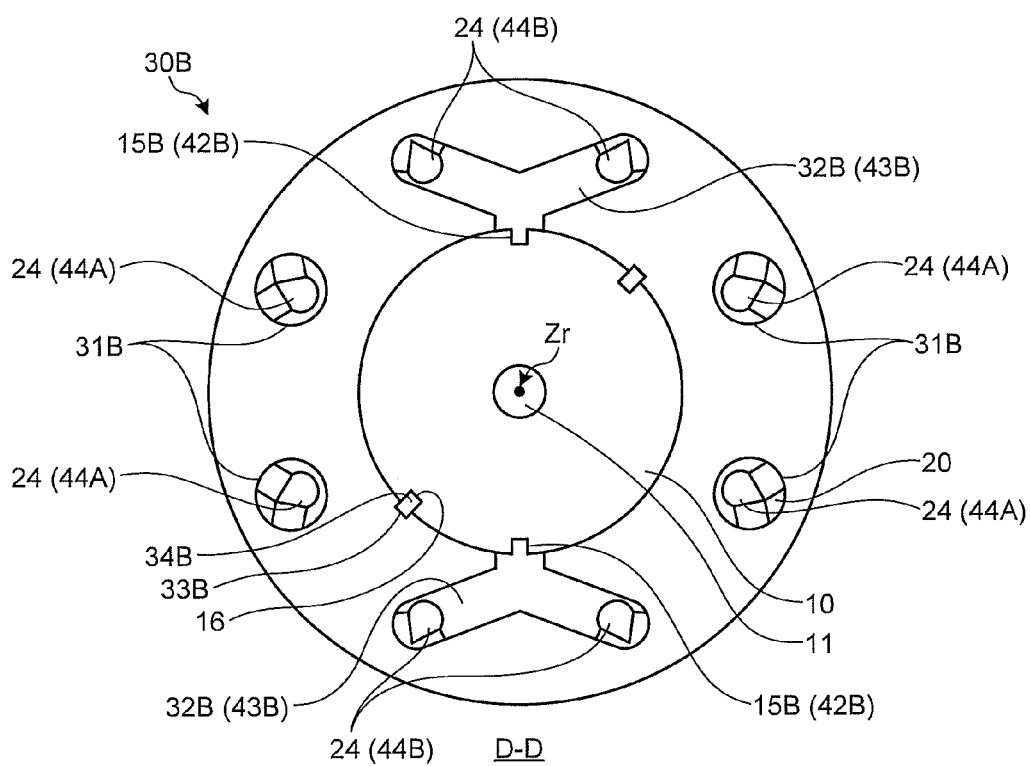
FIG. 11 is a D-D arrow view of FIG. 5.
Figure 12:
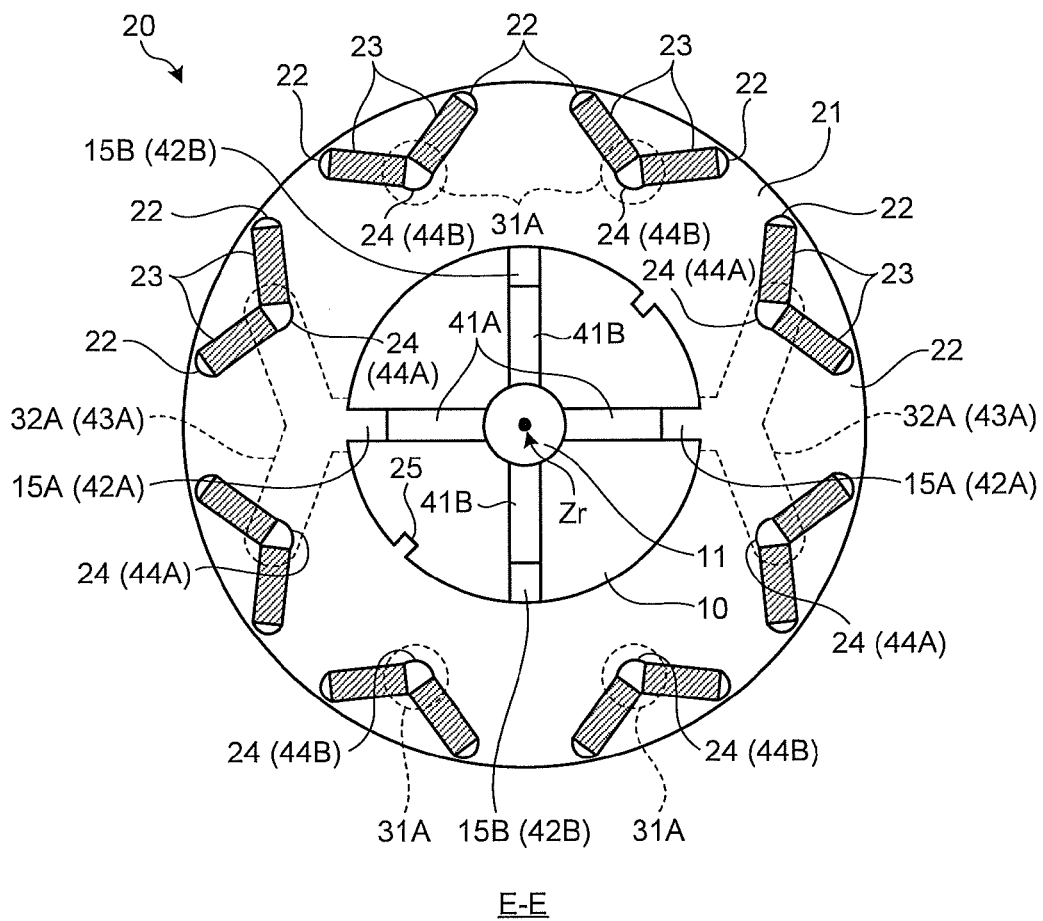
FIG. 12 is an E-E arrow view of FIG. 5.
Figure 13:
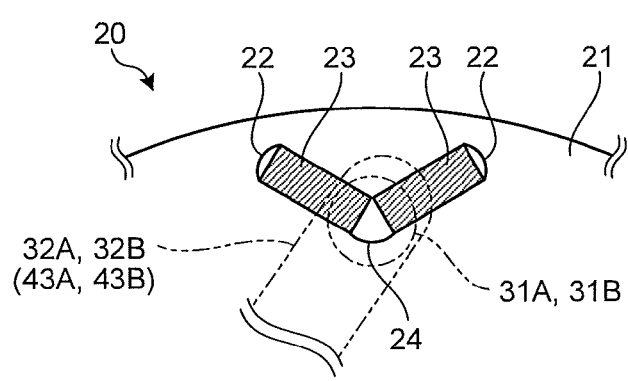
FIG. 13 is an enlarged view of the rotor core included in the motor according to the present embodiment.

FIG. 4 is a front view of the shaft and the rotor core included in the motor according to the present embodiment, when viewed from the input/output side of the shaft. FIG. 5 is a side view of the shaft and the rotor core included in the motor according to the present embodiment. FIGS. 4 and 5 are to illustrate the cross-sectional surface illustrated in FIG. 12 from FIGS. 6, 8 and 10. FIG. 6 is an A-A arrow view of FIG. 4, and FIG. 7 is an enlarged view of the groove illustrated in FIG. 6. FIG. 8 is a B-B arrow view of FIG. 4, and FIG. 9 is an enlarged view of the groove illustrated in FIG. 8. FIG. 10 is a C-C arrow view of FIG. 5, and FIG. 11 is a D-D arrow view of FIG. 5. FIG. 12 is an E-E arrow view of FIG. 5. FIG. 13 is an enlarged view of the rotor core included in the motor according to the present embodiment.

As illustrated in FIG. 6, two first cooling medium passages 41A and 41A extending to the radial outside are branched from the cooling medium supply passage 11. In the present embodiment, each of first cooling medium passages 41A and 41B has a central axis perpendicular to the central rotation axis Zr. Therefore, the first cooling medium passages 41A and 41B are branched in a direction that is inclined by 90 degrees with respect to the cooling medium supply passage 11 included in the shaft 10. By this configuration, the two first cooling medium passages 41A and 41A extend toward the radial outside of the shaft 10. Also, the angle between the central rotation axis Zr and the central axis of the first cooling medium passages 41A and 41B may be other than 90 degrees.

Two grooves 15A and 15A extending in the axial direction of the shaft 10 are formed at the surface 10S of the shaft 10. That is, the shaft 10 includes the grooves 15A and 15A extending in the axial direction. As illustrated in FIGS. 6 and 7, the first cooling medium passages 41A and 41A are opened in the respective grooves 15A and 15A. Also, the grooves 15A and 15A extend toward the one end portion 10C of the shaft 10. The first cooling medium passage 41A is a portion of the cooling medium passage 40A illustrated in FIG. 3. Also, when the rotor core 20 is attached to the shaft 10, the space surrounded by the groove 15A and the rotor core 20 becomes a second cooling medium passage 42A. That is, the second cooling medium passage 42A extends in the axial direction of the shaft 10. The second cooling medium passage 42A is also a portion of the cooling medium passage 40A illustrated in FIG. 3.

FIG. 8 illustrates a cross-sectional surface in the case where the shaft 10 is cut along a plane that is different by 90 degrees from that of FIG. 6 in terms of the center angle around the central rotation axis Zr. As illustrated in FIG. 8, two first cooling medium passages 41B and 41B extending to the radial outside are branched from the cooling medium supply passage 11. Two grooves 15B and 15B extending in the axial direction of the shaft 10 are formed at the surface 10S of the shaft 10. That is, the shaft 10 includes the grooves 15B and 15B extending in the axial direction. As illustrated in FIGS. 8 and 9, the first cooling medium passages 41B and 41B are opened in the respective grooves 15B and 15B.

Also, unlike the above-described grooves 15A and 15A, the grooves 15B and 15B extend toward the other end portion 10R of the shaft 10. The first cooling medium passage 41B is a portion of the cooling medium passage 40B illustrated in FIG. 3. Also, when the rotor core 20 is attached to the shaft 10, the space surrounded by the groove 15B and the rotor core 20 becomes a second cooling medium passage 42B. That is, the second cooling medium passage 42B extends in the axial direction of the shaft 10. The second cooling medium passage 42B is also a portion of the cooling medium passage 40B illustrated in FIG. 3.

The cooling medium flowing from the cooling medium inlet 11I into the cooling medium supply passage 11 flows into the first cooling medium passage 41A illustrated in FIG. 6 and the first cooling medium passage 41B illustrated in FIG. 8, and then changes the direction by 90 degrees and flows into the second cooling medium passage 42A illustrated in FIG. 6 and the second cooling medium passage 42B illustrated in FIG. 8. In the present embodiment, the cooling medium flowing into the cooling medium supply passage 11 is branched into four passages. When the grooves 15A and 15B provided at the surface 10S of the shaft 10 are used as the second cooling medium passages 42A and 42B, it is not necessary to process the rotor core 20 in order to form the second cooling medium passages 42A and 42B. Therefore, in the present embodiment, since the degradation of the magnetic characteristics of the rotor core 20 caused by the providing of the second cooling medium passages 42A and 42B hardly occurs, the performance degradation of the motor 1 by the second cooling medium passages 42A and 42B hardly occurs. Also, since the processing of the rotor core 20 is unnecessary, the manufacturing cost of the rotor core 20 can be reduced. In addition, since the grooves 15A and 15B can prevent slippage when holding the shaft 10, and can serve as a landmark when attaching the rotor core 20 or the balance plates 30A and 30B to the shaft 10, the manufacturing efficiency of the motor 1 can be improved.

<Balance Plate>

As illustrated in FIG. 10, the balance plate 30A includes a plurality of cooling medium outlets 31A (four cooling medium outlets 31A in the present embodiment) and two connection portions 32A and 32A. As illustrated in FIG. 3, the cooling medium outlet 31A is connected to the ejection hole 40BH where the cooling medium passage 40B is opened to the surface of the rotor core 20. The connection portion 32A is a concave portion that is concaved toward the thickness direction of the balance plate 30A (the direction parallel to the central rotation axis Zr). The connection portion 32A is a third cooling medium passage 43A, and is a portion of the cooling medium passage 40A illustrated in FIG. 3. The connection portion 32A connects the groove 15A (second cooling medium passage 42A) and a through hole of the rotor core 20 (fourth cooling medium passage) at the end portion of the rotor core 20. In the present embodiment, the connection portion 32A is connected to two through holes toward the circumferential direction of the rotor core 20, but may be connected to at least one through hole. The through hole (fourth cooling medium passage) will be described below. The two connection portions 32A and 32A are disposed to be point-symmetrical with respect to the central rotation axis Zr. Also, the plurality of cooling medium outlets 31A are disposed to be line-symmetrical with respect to a line that passes through the two grooves 15A and 15A and the central rotation axis Zr. The shaft 10 is provided with a key groove 16, and the balance plate 30A is also provided with a key groove 33A. A key 34A is interposed between a key groove 16A and the key groove 33A, so that the position of the balance plate 30A attached to the shaft 10 is determined and the rotation thereof is restricted. Also, the cooling medium supply passage 11 is represented at the shaft 10.

As illustrated in FIG. 11, the balance plate 30B includes a plurality of cooling medium outlets 31B (four cooling medium outlets 31B in the present embodiment) and two connection portions 32B and 32B. As illustrated in FIG. 3, the cooling medium outlet 31B is connected to the ejection hole 40AH where the cooling medium passage 40A is opened to the surface of the rotor core 20. Like the above-described connection portion 32A, the connection portion 32B is a concave portion that is concaved toward the thickness direction of the balance plate 30B (the direction parallel to the central rotation axis Zr). The connection portion 32B is a third cooling medium passage 43B, and is a portion of the cooling medium passage 40B illustrated in FIG. 3. The connection portion 32B connects the groove 15B (second cooling medium passage 42B) and a through hole 24 of the rotor core 20 (fourth cooling medium passage 44B). In the present embodiment, the connection portion 32B is also connected to two through holes toward the circumferential direction of the rotor core 20, but may be connected to at least one through hole. The through hole 24 passes through the rotor core 20 toward the stacking direction of the plurality of steel plates 21 (the direction parallel to the central rotation axis Zr). Therefore, the through hole 24 is connected to the balance plates 30A and 30B.

The two connection portions 32B and 32B are disposed to be point-symmetrical with respect to the central rotation axis Zr. The plurality of cooling medium outlets 31B are disposed to be line-symmetrical with respect to a line that passes through the two grooves 15B and 15B and the central rotation axis Zr. In FIG. 11, the through hole 24 of the rotor core 20 (fourth cooling medium passage 44A) is represented at each of the cooling medium outlets 31B.

The shaft 10 is provided with the key groove 16, and the balance plate 30B is also provided with a key groove 33B. Also, the cooling medium supply passage 11 is represented at the shaft 10. A key 34B is interposed between a key groove 16B and the key groove 33B, so that the position of the balance plate 30B attached to the shaft 10 is determined and the rotation thereof is restricted. The key groove 16 provided in the shaft 10 is common at any position in the balance plates 30A and 30B. With respect to the key groove 16, the connection portions 32B and 32B of the balance plate 30B are disposed at positions that are determined by rotating the connection portions 32A and 32A of the balance plate 30A by 90 degrees around the central rotation axis Zr. Also, the plurality of cooling medium outlets 31B of the balance plate 30B are disposed at positions that are determined by rotating the plurality of cooling medium outlets 31A of the balance plate 30A by 90 degrees around the central rotation axis Zr. By this configuration, while the balance plates 30A and 30B are in a state of being attached to the shaft 10, when the connection portion 32A of the balance plate 30A is projected on the balance plate 30B, the cooling medium outlet 31B of the balance plate 30B and the connection portion 32A overlap with each other. Likewise, in the same state, when the connection portion 32B of the balance plate 30B is projected on the balance plate 30A, the cooling medium outlet 31A of the balance plate 30A and the connection portion 32B overlap with each other.

The through hole 24 of the rotor core 20 (fourth cooling medium passage 44A) is represented at the connection portion 32B of the balance plate 30B, and the through hole 24 (fourth cooling medium passage 44B) is represented at each of the plurality of cooling medium outlets 31B. As described above, the through hole 24 passes through the rotor core 20 toward the stacking direction of the plurality of steel plates 21 and is connected to the balance plates 30A and 30B. In the present embodiment, the rotor core 20 includes a plurality of through holes (eight through holes in this example), and the plurality of through holes 24 are provided on concentric circles around the central rotation axis Zr.

Since the cooling medium outlet 31B of the balance plate 30B and the connection portion 32A of the balance plate 30A overlap with each other, both are connected by the through hole 24 that is the fourth cooling medium passage 44B. Also, since the connection portion 32B of the balance plate 30B and the cooling medium outlet 31B of the balance plate 30A overlap with each other, both are connected by the through hole 24 that is the fourth cooling medium passage 44A. As will be described below, the fourth cooling medium passage 44A is a portion of the cooling medium passage 40A illustrated in FIG. 3, and the fourth cooling medium passage 44B is a portion of the cooling medium passage 40B illustrated in FIG. 3.

<Rotor Core>

As illustrated in FIG. 12, a protrusion 25 is provided at each of the steel plates 21 included in the rotor core 20. The protrusion 25 is fitted into the key groove 16 of the shaft 10 to determine the position of the steel plate 21 and restrict the rotation thereof. Since the key groove 16 of the shaft 10 is common toward the axial direction of the shaft 10, the positional relation between the plurality of steel plates 21 and the balance plates 30A and 30B are determined with respect to the key groove 16.

As illustrated in FIGS. 12 and 13, the rotor core 20 includes the through hole 24 and a magnet holding hole 22. The through hole 24 passes through toward the axial direction of the shaft 10 (the stacking direction of the stacked steel plates). The through hole 24 is opened to both end portions of the rotor core 20, and is also opened to the magnet holding hole 22. The magnet holding hole 22 passes through toward the axial direction of the shaft 10 (the stacking direction of the stacked steel plates), and holds a magnet (permanent magnet) 23. Also, the through hole 24 may not be opened to the magnet holding hole 22. Also, in the present embodiment, a plurality of magnet holding holes 22 (16 magnet holding holes 22 in this example) are formed along the circumferential direction of the rotor core 20, but the number of magnet holding holes 22 is not limited thereto.

In the present embodiment, the through holes 24 are provided at portions adjacent to two magnet holding holes 22 in the radial inside of the rotor core 20, and are opened respectively. Therefore, in the present embodiment, the through hole 24 connects two adjacent magnet holding holes 22. In the present embodiment, the through holes 24 are provided at a plurality of positions (eight positions in the present embodiment) along the circumferential direction of the rotor core 20. The through holes 24 of the rotor core 20 are used to cool the rotor core 20. In this embodiment, eight through holes 24 are provided, but at least one through hole 24 may be provided and the number of through holes 24 is not limited thereto. Also, the through holes 24 are not limited to those of the present embodiment. For example, two through holes 24 may be separately opened to two adjacent magnet holding holes 22.

As illustrated in FIG. 13, the through holes 24 overlap with the cooling medium outlets 31A and 31B and the connection portions 32A and 32B (third cooling medium passages 43A and 43B). As described above, the through holes 24 are the fourth cooling medium passages 44A and 44B that are the portions of the cooling medium passages 40A and 40B. The cooling medium passes through the through hole 24 toward the cooling medium outlet 31A from the cooling medium outlet 31B or the connection portion 32B. While the cooling medium passes through the through hole 24, the rotor core 20 is cooled. Also, since the through hole 24 is opened to the magnet holding hole 22, a portion of the magnet 23 is exposed to the through hole 24. Therefore, the cooling medium flows through the through hole 24, so that the magnet 23 is also cooled. Also, the through hole 24 need not necessarily be opened to the magnet holding hole 22.

<Cooling Structure and Cooling Medium Passage>

Figure 14:
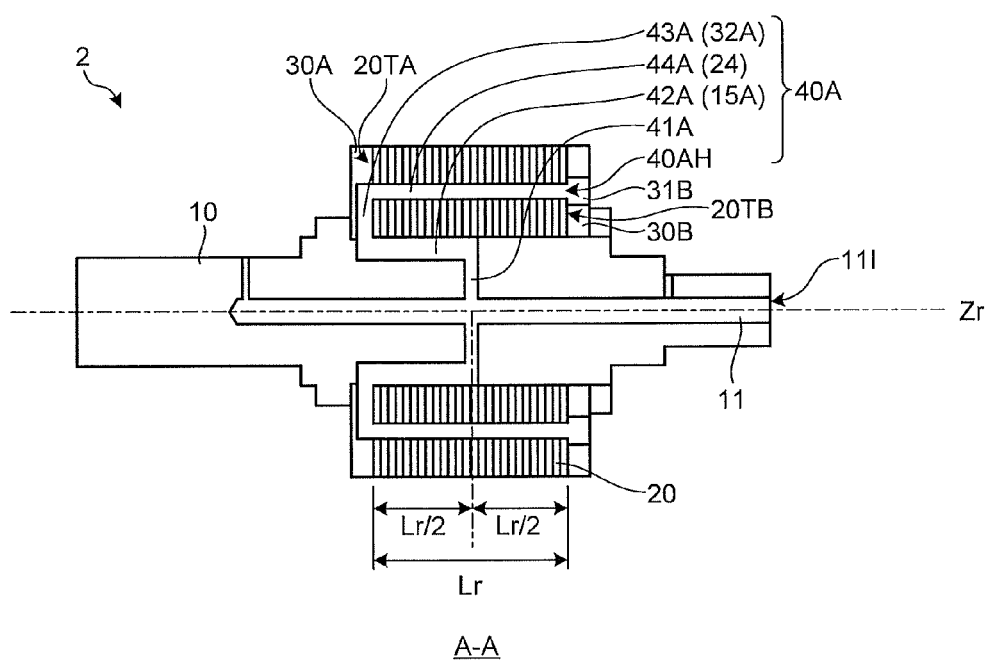
FIG. 14 is a view illustrating a cooling structure and a cooling medium passage according to the present embodiment.
Figure 15:
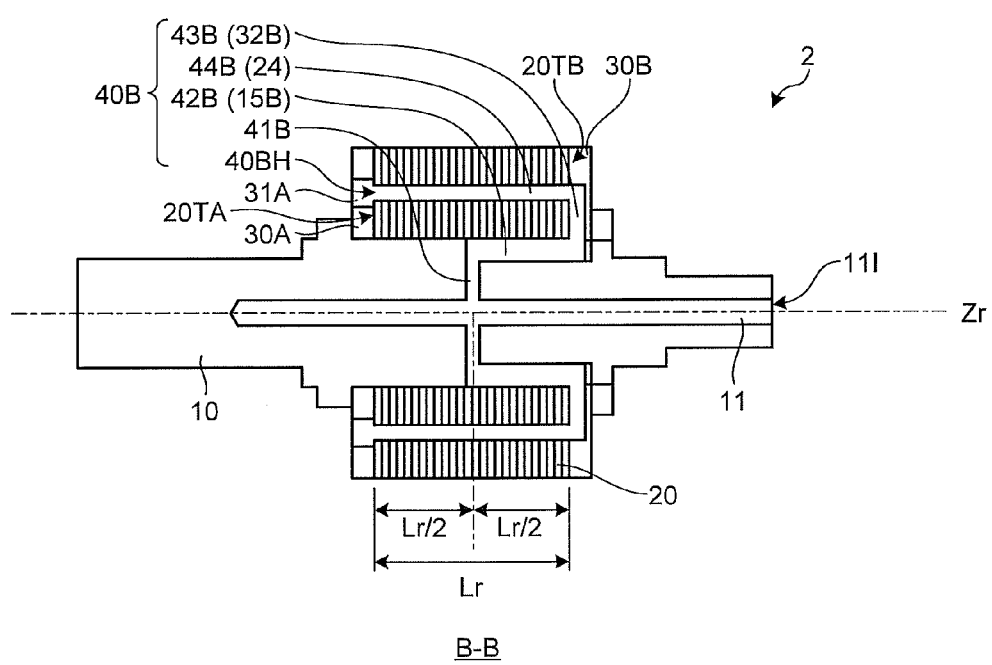
FIG. 15 is a view illustrating a cooling structure and a cooling medium passage according to the present embodiment.
Figure 16:
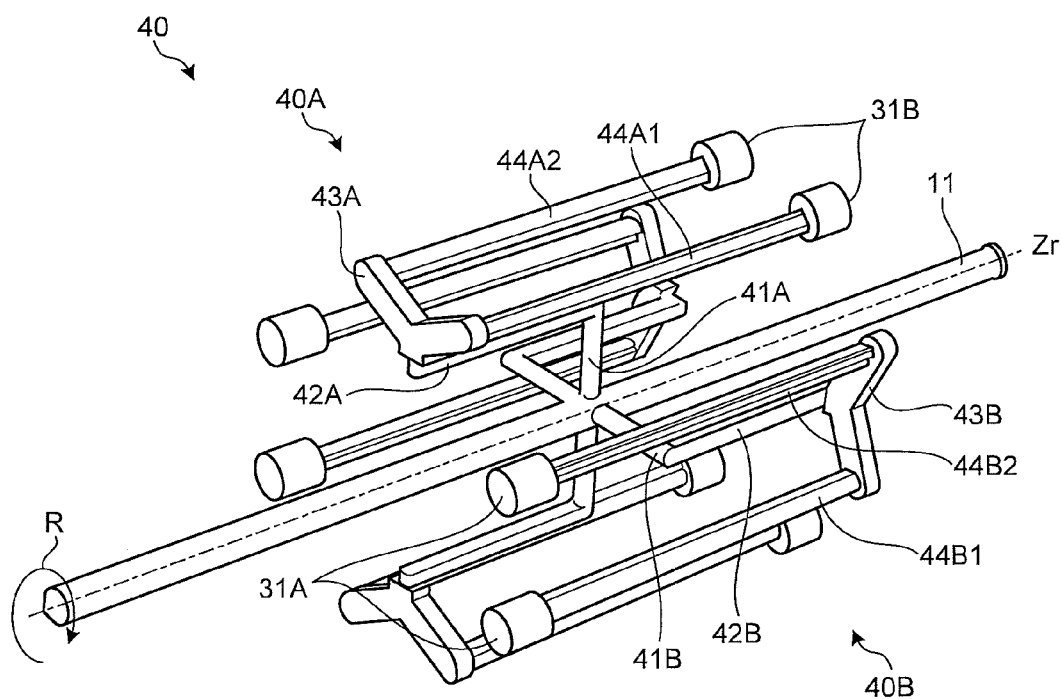
FIG. 16 is a perspective view illustrating a cooling medium supply passage and a cooling medium passage.
Figure 17:
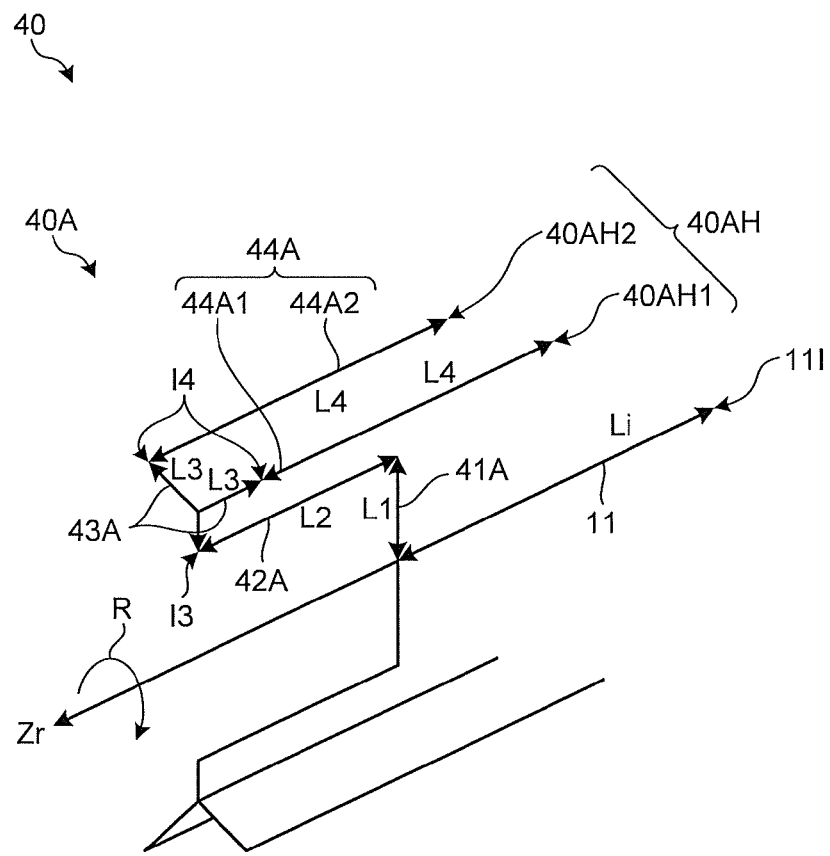
FIG. 17 is a pattern diagram illustrating an arrangement of the cooling medium supply passage and the cooling medium passage.
Figure 17:
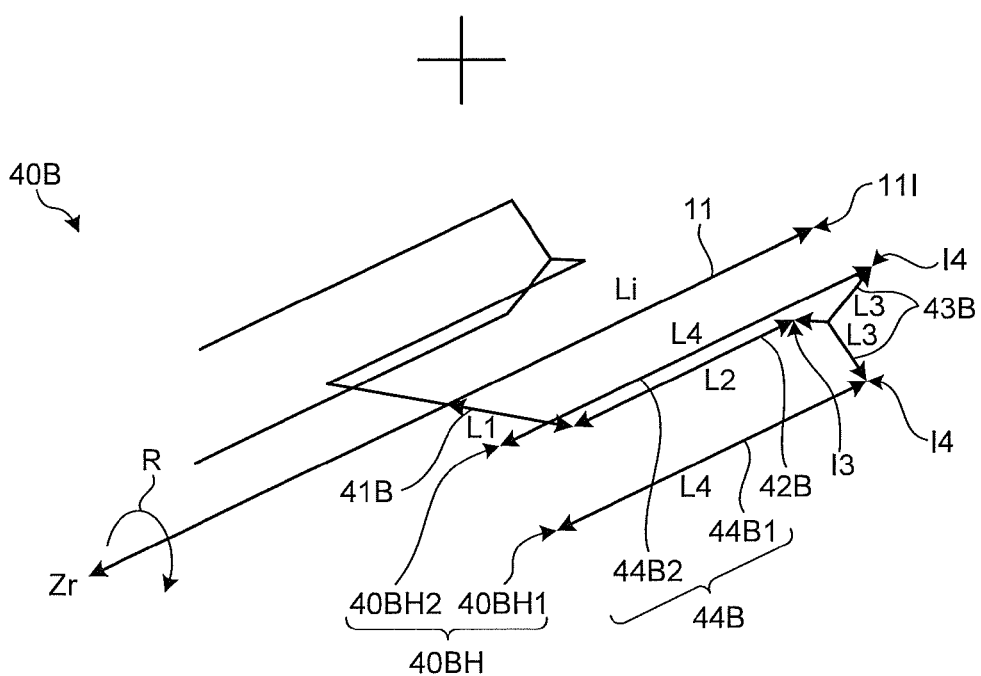

FIGS. 14 and 15 are views illustrating the cooling structure and the cooling medium passage according to the present embodiment. FIG. 16 is a perspective view illustrating the cooling medium supply passage and the cooling medium passage. FIG. 17 is a pattern diagram illustrating an arrangement of the cooling medium supply passage and the cooling medium passage. As described above, the cooling medium passage 40A represented at the A-A cross-sectional surface includes a first cooling medium passage 41A, a second cooling medium passage 42A (groove 15A), a third cooling medium passage 43A (connection portion 32A), a fourth cooling medium passage 44A (through hole 24), and an ejection hole 40AH. Also, the cooling medium passage 40B represented at the B-B cross-sectional surface includes a first cooling medium passage 41B, a second cooling medium passage 42B (groove 15A), a third cooling medium passage 43B (connection portion 32B), a fourth cooling medium passage 44B (through hole 24), and an ejection hole 40BH. The cooling structure 2 includes a cooling medium supply passage 11 and a plurality of cooling medium passages 40A and 40B.

The cooling medium flowing through the cooling medium supply passage 11 are branched from the first cooling medium passages 41A and 41B of the respective cooling medium passages 40A and 40B and flows to the radial outside of the shaft 10. Thereafter, the cooling medium changes the flow direction by 90 degrees, flows into the second cooling medium passages 42A and 42B, and flows toward the radial direction of the shaft 10. While passing through the second cooling medium passages 42A and 42B, the cooling medium cools the rotor core 20 from the inner periphery side. Therefore, since the rotor core 20 can be directly cooled and the magnet 23 of the rotor can be indirectly cooled, the heating-up of the magnet 23 can be suppressed and the degradation of the magnetic characteristics can be suppressed.

The cooling medium having passed through the second cooling medium passages 42A and 42B flows out from end portions 20TA and 20TB of the rotor core 20. Thereafter, the cooling medium changes the flow direction by 180 degrees at the third cooling medium passages 43A and 43B disposed at the end portion of the rotor core 20, and flows into the fourth cooling medium passages 44A and 44B. Thereafter, in the process of passing through the fourth cooling medium passages 44A and 44B, the cooling medium flows toward the ejection holes 40AH and 40BH while cooling the rotor core 20 and the magnet 23 of the rotor core 20.

The ejection hole 40AH of the cooling medium passage 40A is opened to the end portion 20TB of the rotor core 20, and the ejection hole 40BH of the cooling medium passage 40B is opened to the end portion 20TA of the rotor core 20. In this manner, the election holes 40AH and 40BH are opened to the surface of the rotor core 20. The cooling medium ejected from the ejection hole 40AH flows out to the cooling medium outlet 31B of the balance plate 30B, and the cooling medium ejected from the ejection hole 40BH flows out to the cooling medium outlet 31A of the balance plate 30A. When the rotor core 20 rotates together with the shaft 10, the cooling medium is blown by the centrifugal force of the rotor core 20 from the cooling medium outlets 31A and 31B to the coil end 6CE illustrated in FIG. 3, so that the cooling medium collides against the coil end 6CE and cools the coil end 6CE.

In this manner, the respective ejection holes 40AH and 40BH of the cooling medium passages 40A and 40B are respectively opened to both end portions 20TB and 20TA of the rotor core 20. By this configuration, the cooling medium can be supplied to the coil end 6CE on both sides of the shaft 10 in the axial direction to cool the coil end 6CE. Also, in the present embodiment, the cooling medium passages 40A and 40B have the same distance (passage distance) L from the cooling medium inlet 11I to the ejection holes 40AH and 40BH. In the present embodiment, the equality not only includes complete equality, but also includes those that are different in tolerance or manufacturing error.

As illustrated in FIG. 17, the passage distance L is equal to the sum (the length of the cooling medium passages 40A and 40B) of the distance (supply passage distance) L1 from the cooling medium inlet 11I to the inlets of the first cooling medium passages 41A and 41B, the length L1 of the first cooling medium passages 41A and 41B, the length L2 of the second cooling medium passages 42A and 42B, the length L3 of the third cooling medium passages 43A and 43B, and the length L4 of the fourth cooling medium passages 44A and 44B. In this embodiment, the passage distance is measured according to the central axis of the cooling medium supply passage 11 and the first cooling medium passages 41A and 41B (the axis obtained by connecting the centroids of the respective cross-sectional views).

As illustrated in FIGS. 16 and 17, in the present embodiment, the third cooling medium passage 43A branches the second cooling medium passage 42A into two fourth cooling medium passages 44A1 and 44A2. Also, the third cooling medium passage 43B branches the second cooling medium passage 42B into two fourth cooling medium passages 44B1 and 44B2. Therefore, the length L3 of the third cooling medium passage 43A is equal to the distance from the inlet I3 of the third cooling medium passage 43A to the inlet I4 of the fourth cooling medium passage 44A1 or 44A2 (the same is true for the third cooling medium passage 43B). Also, the distance from the inlet I3 of the third cooling medium passage 43A to the inlet I4 of the one-side fourth cooling medium passage 44A1 is equal to the distance from the inlet I3 of the third cooling medium passage 43A to the inlet I4 of the other-side fourth cooling medium passage 44A2.

When the length L3 from the inlet I3 of the third cooling medium passage 43A to the one-side fourth cooling medium passage 44A1 is used as the length L3 of the third cooling medium passage 43A, the length of the fourth cooling medium passage 44A1 is used as the length L4 of the fourth cooling medium passage 44A. When the length L3 from the inlet I3 of the third cooling medium passage 43A to the other-side fourth cooling medium passage 44A2 is used as the length L3 of the third cooling medium passage 43A, the length of the fourth cooling medium passage 44A2 is used as the length L4 of the fourth cooling medium passage 44A.

In the present embodiment, the positions of the plurality of cooling medium passages 40A and 40B branched from the cooling medium supply passage 11 are the same in the axial direction of the shaft 10. Therefore, in the cooling medium passages 40A and 40B for ejecting the cooling mediums to the different end portions of the rotor core 20, the respective supply passage distances L1 are equal to each other.

In the present embodiment, the cooling medium supply passage 11 in the shaft 10 having a circular cross-sectional surface has a circular cross-section surface and has the central axis identical to the central rotation axis Zr (the cross-sectional surface is a cross-sectional surface taken along a plane perpendicular to the central rotation axis Zr). Therefore, in the portion where the cooling medium supply passage 11, the thicknesses of the shaft 10 are equal, and the lengths L1 of the first cooling medium passages 41A and 41B of the cooling medium passages 40A and 40B are equal.

The position at which each of the first cooling medium passages 41A and 41B is opened to the surface of the shaft 10 is the central portion of the rotor core 20 in the axial direction of the shaft 10. Therefore, the lengths L2 of the second cooling medium passages 42A and 42B connected respectively to the first cooling medium passages 41A and 41B are equal to each other.

The two connection portions 32A and 32B have the same dimension and shape. Also, the fourth cooling medium passages 44A and 44B, that is, the plurality of through holes 24 are provided on the same concentric circle around the central rotation axis Zr. Therefore, the lengths L3 of the third cooling medium passages 43A and 43B are equal to each other. Since all of the fourth cooling medium passages 44A and 44B pass through the rotor core 20 in parallel to the central rotation axis Zr, the lengths L4 of the fourth cooling medium passages 44A and 44B are equal to each other.

Therefore, as described above, in the cooling medium passages 40A and 40B for ejecting the cooling mediums to the different end portions of the rotor core 20, the respective passage distances L (=L1+L1+L2+L3+L4) are equal to each other.

In this way, the cooling medium passages 40A and 40B for ejecting the cooling mediums to the different end portions of the rotor core 20 have substantially the same pressure loss from the cooling medium inlet 11I to ejection holes 40AH1, 40AH2, 40BH1 and 40BH2. Therefore, the cooling structure 2 can substantially equalize the flow rates of the cooling mediums flowing through the respective cooling medium passages 40A and 40B, and can suppress a variation in the flow rates of the cooling mediums ejected from the respective ejection holes 40AH1, 40AH2, 40BH1 and 40BH2. As a result, the cooling variation of the rotor core 20 by the cooling mediums flowing through the cooling medium passages 40A and 40B and the cooling variation of both coil ends 6CE can be reduced. Therefore, the cooling structure 2 can suppress the local heating-up of the rotor core 20 and the coil end 6CE, and thus can suppress the performance degradation of the motor 1 caused by the heating-up of the coil 6C, the magnet 23, and the rotor core 20.

In the cooling structure 2, when there is a variation in the flow rates of the cooling mediums ejected from the respective ejection holes 40AH1, 40AH2, 40BH1 and 40BH2, it is necessary for the ejection hole with the lowest flow rate to achieve a required cooling performance. Then, the ejection hole with a high flow rate provides an excessive flow rate of cooling medium in comparison with the required cooling performance. This causes the supply of an excessive cooling medium to the cooling medium passage, thus leading to an increase in the energy required to eject the excessive cooling medium. Also, since an excessive amount of cooling medium is supplied from the ejection hole with a high flow rate, a large amount of cooling medium is supplied to the inside of the housing 3. As a result, since the rotor core 20 agitates a large amount of cooling medium present in the housing 3 during rotation, the energy loss by the agitation of the cooling medium increases.

The cooling structure 2 of the present embodiment can substantially equalize the passage distances L of the respective cooling medium passages 40A and 40B, and thus can suppress a variation in the flow rates of the cooling mediums ejected from the respective ejection holes 40AH1, 40AH2, 40BH1 and 40BH2. Therefore, since the excess of a cooling medium flow rate over the required cooling performance can be suppressed, the power consumption required for the supply of the cooling medium can be suppressed. Also, the cooling structure 2 can appropriately control the amount of the cooling medium present in the housing 3, and thus can suppress the energy loss caused by the agitation of a large amount of cooling medium by the rotor core 20.

Also, in the present embodiment, the cooling medium passage 40A includes two fourth cooling medium passages 44A1 and 44A2, and the cooling medium passage 40B includes the two fourth cooling medium passages 44B1 and 44B2. Accordingly, the cooling medium passage 40A includes two ejection holes 40AH1 and 40AH2 as an ejection hole 40AH, and the cooling medium passage 40B includes two ejection holes 40BH1 and 40BH2 as an ejection hole 40BH.

In the case of this configuration, it can be considered that the cooling medium passage 40A includes two passages that are a passage including the fourth cooling medium passage 44A1 and a passage including the fourth cooling medium passage 44A2. Herein, the length of the fourth cooling medium passage 44A1 is denoted by L4$a$, and the length of the fourth cooling medium passage 44A2 is denoted by L4$b$. Since all of the fourth cooling medium passages 44A1 and 44A2 pass through the rotor core 20 in parallel to the central rotation axis Zr, the lengths L4 of the fourth cooling medium passages 44A1 and 44A2 are equal to each other (L4$a$=L4$b$). Then, in the cooling medium passage 40A, the passage distance L1 (=L1+L1+L2+L3+L4$a$) of a passage including the fourth cooling medium passage 44A1 is equal to the passage distance L2 (=L1+L1+L2+L3+L4$b$) of a passage including the fourth cooling medium passage 44A2. Therefore, in the cooling medium passage 40A, since the pressure loss of the passage including the fourth cooling medium passage 44A1 and the pressure loss of the passage including the fourth cooling medium passage 44A2 can be substantially equalized, the flow rate variation of the cooling mediums ejected from the fourth cooling medium passages 44A1 and 44A2 can be suppressed. When the cooling structure 2 includes two cooling medium passages 40A, the respective passage distances L in four passages in the two cooling medium passages 40A are equalized. As a result, since the pressure losses of the four passages in the two cooling medium passages 40A can be substantially equalized, the flow rate variation of the cooling mediums ejected from the four passages can be suppressed.

The above-described relation is the same as for the respective cooling medium passages 40B included in the cooling structure 2. Therefore, in the entire cooling structure 2, the passage distances L of eight passages in two cooling medium passages 40A and two cooling medium passages 40B are equalized. As a result, since the pressure losses of the eight passages can be substantially equalized, the flow rate variation of the cooling mediums ejected from openings, at which the eight passages are opened to both end portions of the rotor core 20, can be suppressed.

After branching from the cooling medium supply passage 11, each of the cooling medium passages 40A and 40B flows a cooling medium without branching the cooling medium in the axial direction of the shaft 10. In the present embodiment, the cooling medium passages 40A and 40B include the second cooling medium passages 42A and 42B and the fourth cooling medium passages 44A and 44B that are parallel to the axial direction of the shaft 10. The cooling medium passages 40A and 40B are connected to the second cooling medium passages 42A and 42B after branching from the cooling medium supply passage 11 in the first cooling medium passages 41A and 41B that are oriented to the radial outside of the shaft 10 (and rotor core 20). The second cooling medium passages 42A and 42B are connected to the third cooling medium passages 43A and 43B. Also, the fourth cooling medium passages 44A and 44B are connected to the third cooling medium passages 43A and 43B on the same side as the second cooling medium passages 42A and 42B. Therefore, the cooling medium passages 40A and 40B are returned by 180 degrees at the third cooling medium passages 43A and 43B.

The second cooling medium passages 42A and 42B connect the outlets of the first cooling medium passages 41A and 41B and the inlets of the third cooling medium passages 43A and 43B, and are not branched therebetween. Likewise, the fourth cooling medium passages 44A and 44B connect the outlets of the third cooling medium passages 43A and the ejection holes 40AH and 40BH, and are not branched therebetween. In this configuration, for example, when the second cooling medium passages 42A and 42B parallel to the axial direction of the shaft 10 are branched in the axial direction, the cooling medium flows more to the side that is branched in the acting direction of a force of a component parallel to the axial direction of the shaft 10. As a result, since the cooling medium is ejected more from the end portion of the rotor core 20 in the acting direction of the force, the cooling variation of the coil end 6CE in the axial direction occurs.

The cooling medium passages 40A and 40B flows a cooling medium without branching the cooling medium in the axial direction of the shaft 10. In this manner, since the cooling medium passages 40A and 40B do not include a passage branched in the axial direction, even when the cooling medium having flowed therethrough receives the force of the component parallel to the axial direction of the shaft 10, the flow rate unbalance between the branched passages does not occur. As a result, the cooling structure 2 can suppress a flow rate change of the cooling mediums passing through the cooling medium passages 40A and 40B, which is caused by the force. Therefore, the cooling structure 2 can suppress the flow rate unbalance of the cooling mediums ejected from both end portions 20TA and 20TB of the rotor core 20, and thus can reduce the cooling variation of the coil end 6CE in the axial direction and the cooling variation of the rotor core 20 in the axial direction.

Particularly, in the present embodiment, the cooling medium passages 40A and 40B are opposite to the direction of the cooling medium passing through the second cooling medium passages 42A and 42B extending in parallel to the axial direction of the shaft 10, and the direction of the cooling medium passing through the fourth cooling medium passages 44A and 44B extending in parallel to the axial direction of the shaft 10. By this configuration, when a force of a component parallel to the axial direction of the shaft 10 accelerates the cooling medium passing through the second cooling medium passages 42A and 42B, the force decelerates the cooling medium passing through the fourth cooling medium passages 44A and 44B. Therefore, even when the cooling medium receives a force of a component parallel to the axial direction of the shaft 10, the cooling structure 2 can nearly cancel the force between the second cooling medium passages 42A and 42B and the fourth cooling medium passages 44A and 44B. As a result, even when the cooling medium receives a force of a component parallel to the axial direction of the shaft 10, the cooling structure 2 can suppress the flow rate variation of the cooling mediums between the plurality of cooling medium passages 40A and 40B, and thus can more securely reduce the cooling variation of the core end 6CE in the axial direction and the cooling variation of the rotor core 20 in the axial direction.

A construction vehicle such as the wheel loader 100 illustrated in FIG. 1 usually performs an operation in an inclined area. In an inclined area, the cooling medium flowing through the cooling medium passages 40A and 40B is subject to receive a force of a component parallel to the axial direction of the shaft 10. Also, the wheel loader rapidly enters earth and sand, skims the earth and sand into the bucket 103, rapidly retreats, turns while accelerating rapidly in the forward direction, abruptly stops at the position of a dump or the like to be loaded with the earth and sand, and loads the earth and sand on the dump. In this manner, the wheel loader 100 may perform an operation that requires repeated rapid acceleration in the longitudinal direction and the lateral direction (perpendicular to the longitudinal direction). In this case, the cooling medium flowing through the cooling medium passages 40A and 40B may also be subject to receive a force of a component parallel to the axial direction of the shaft 10. As described above, the cooling structure 2 and the motor 1 according to the present embodiment can suppress the cooling variation of the coil end 6CE and the rotor core 20 in the axial direction even when the cooling medium receives a force of a component parallel to the axial direction of the shaft 10. Therefore, the cooling structure 2 and the motor 1 are suitable for an operation requiring repeated rapid acceleration in the longitudinal direction and the lateral direction, such as in the wheel loader 100.

Also, in the present embodiment, the third cooling medium passage 43A of the cooling medium passage 40A branches the cooling medium flowed in from the second cooling medium passage 42A into two fourth cooling medium passages 44A1 and 44A2 (the same is true for the third cooling medium passage 43B). That is, since the cooling medium is branched into two fourth cooling medium passages 44A1 and 44A2 toward the circumferential direction of the shaft 10 and the rotor core 20, it satisfies the condition that the cooling medium is flowed without being branched in the axial direction of the shaft 10.

It is preferable that each of the positions of the cooling medium passages 40A and 40B branched from the cooling medium supply passage 11 is the central portion of the rotor core 20 in the axial direction of the shaft 10. In the example illustrated in FIGS. 14 and 15, when the length of the rotor core 20 in the axial direction is Lr, each of the distances from the end portions 20TA and 20TB of the rotor core 20 to the positions of the first cooling medium passages 41A and 41B, that is, the distance to the branching position, is Lr/2. In this way, since the distribution of the cooling medium can be easily balanced on both axial sides of the shaft 10, the cooling variation of the coil end 6CE and the rotor core 20 in the axial direction can be easily suppressed. Also, the passage distances L can be easily equalized between the plurality of cooling medium passages 40A and 40B.

It is preferable that an even number of cooling medium passages 40A and 40B are branched from the cooling medium supply passage 11. In the present embodiment, the respective two cooling medium passages 40A and 40B, that is, four cooling medium passages 40A and 40B are branched from the cooling medium supply passage 11. In this way, since the same number of ejection holes can be provided at both end portions 20TA and 20TB of the rotor core 20, the cooling medium can be ejected from both end portions 20TA and 20TB of the rotor core 20 at substantially equal flow rates. As a result, the cooling variation of the coil end 6CE and the rotor core 20 in the axial direction can be easily suppressed.

It is preferable that the passage distances L of the plurality of cooling medium passages 40A and 40B are equalized and also the dimensions (cross-sectional passage dimensions) and shapes (cross-sectional passage shapes) in the case where the cooling medium passages 40A and 40B are cut along the plane perpendicular to the flow direction of the cooling medium are equalized. The passage distances L are dominant in the pressure losses of the cooling medium passages 40A and 40B. However, by equalizing the cross-sectional passage dimensions and cross-sectional passage shapes between the plurality of cooling medium passages 40A and 40B, the pressure losses between the plurality of cooling medium passages 40A and 40B can be further equalized. As a result, the flow rate variation of the cooling medium between the plurality of cooling medium passages 40A and 40B can be further suppressed, and the cooling variation of the coil end 6CE and the rotor core 20 in the axial direction can be reduced. Also, when the cross-sectional passage dimensions and the cross-sectional passage shapes are equalized, the tolerance and the manufacturing error may be different.

As described above, in the cooling structure 2, the pressure losses of the plurality of cooling medium passages 40A and 40B may be equalized in consideration of a centrifugal force caused by the rotation of the shaft 10 and the rotor core 20. Therefore, in the plurality of cooling medium passages 40A and 40B, when the pressure losses considering the centrifugal force are equal, the cross-sectional passage dimensions and the cross-sectional passage shapes may be different. However, when the passage distances L, the cross-sectional passage dimensions, and the cross-sectional passage shapes are different, the pressure losses between the plurality of cooling medium passages 40A and 40B can be equalized under a specific condition, but it is difficult to equalize the pressure losses under other conditions. Therefore, in the plurality of cooling medium passages 40A and 40B, at least the passage distances L are equalized, and preferably, the cross-sectional passage dimensions and the cross-sectional passage shapes are also equalized. In this way, since the pressure losses between the plurality of cooling medium passages 40A and 40B can be simply equalized in different conditions, the stability and reliability of the cooling structure 2 can be improved. In particular, when the motor 1 is used in a construction vehicle, since the operation condition varies greatly, in order to accommodate this, it is preferable that the passage distances L or the like are equalized.

In order to equalize the pressure losses considering the centrifugal force, it is more preferable that the three-dimensional shapes of the plurality of cooling medium passages 40A and 40B are equalized. That is, it is preferable that the dimensions and shapes of the first cooling medium passages 41A and 41B, the dimensions and shapes of the second cooling medium passages 42A and 42B, the dimensions and shapes of the third cooling medium passages 43A and 43B, and the dimensions and shapes of the fourth cooling medium passages 44A and 44B are equalized. The shape equalization not only includes the equalization of the above-described cross-sectional passage shapes, but also includes the equalization of the angles between the passages and the equalization of the bent states of the portions connecting the passages. Also, the equality includes a difference in the tolerance or the manufacturing error. In this way, the pressure losses considering the centrifugal force can be substantially equalized between the plurality of cooling medium passages 40A and 40B. As a result, the flow rate variation of the cooling medium between the plurality of cooling medium passages 40A and 40B can be further suppressed, and the cooling variation of the coil end 6CE and the rotor core 20 in the axial direction can be further reduced.

<Modified Example of Cooling Medium Passage>

Figure 18:
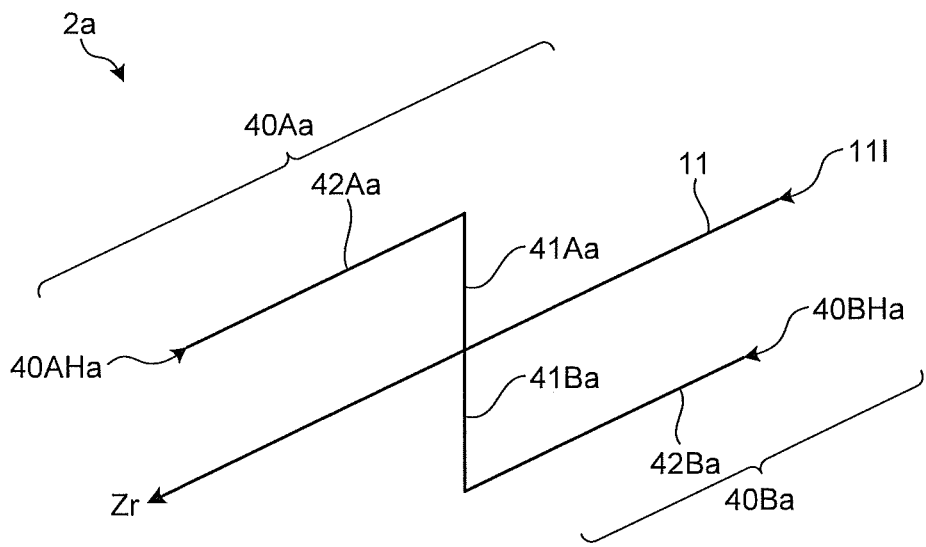
FIG. 18 is a pattern diagram illustrating a modified example of the cooling medium passage included in the cooling structure according to the present embodiment.
Figure 19:
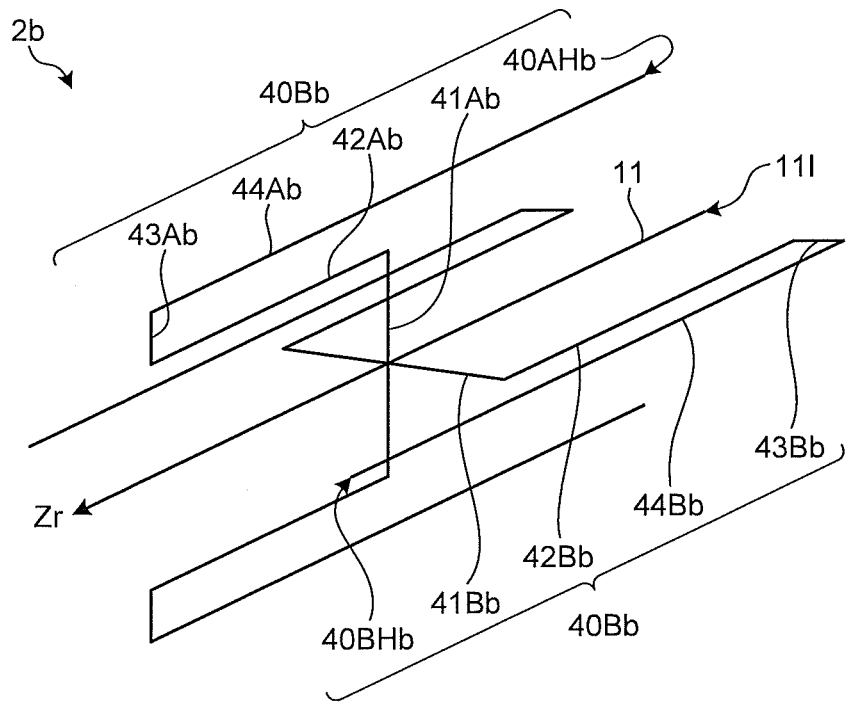
FIG. 19 is a pattern diagram illustrating a modified example of the cooling medium passage included in the cooling structure according to the present embodiment.

FIGS. 18 and 19 are pattern diagrams illustrating modified examples of the cooling medium passage included in the cooling structure according to the present embodiment. A cooling structure 2a of FIG. 18 includes first cooling medium passages 41Aa and 41Ba branched from the cooling medium supply passage 11 toward the radial outside of the shaft 10, second cooling medium passages 42Aa and 42Ba extending in the axial direction of the shaft 10, and ejection holes 40AHa and 40BHb opened to both end portions 20TA and 20TB of the rotor core 20 illustrated in FIGS. 15 and 16. The cooling structure 2a is configured such that the cooling medium passages 40A and 40B are not returned at both end portions 20TA and 20TB of the rotor core 20.

In the cooling structure 2a, the passage distance of cooling medium passages 40Aa and 40Ba is equal to the sum of the distance (supply passage distance) from the cooling medium inlet 11I to the inlet of the first cooling medium passages 41Aa and 41Ba, the length of the first cooling medium passages 41Aa and 41Ba, and the length of the second cooling medium passages 42Aa and 42Ba. Like the cooling structure 2, the cooling structure 2a is configured such that the passage distances of the cooling medium passages 40Aa and 40Ba opened respectively both end portions of the rotor core 20 (the distances from the cooling medium inlet 11I to the respective ejection holes 40AHa and 40BHa) are equal. As a result, the cooling structure 2a can also suppress the cooling variation of the rotor core 20 and the coil end 6CE.

A cooling structure 2b of FIG. 19 includes first cooling medium passages 41Ab and 41Bb branched from the cooling medium supply passage 11 toward the radial outside of the shaft 10, second cooling medium passages 42Ab and 42Bb extending in the axial direction of the shaft 10, third cooling medium passages 43Ab and 43Bb extending toward the radial outside of the shaft 10, fourth cooling medium passages 44Ab and 44Bb extending in the axial direction of the shaft 10, and ejection holes 40AHb and 40BHb opened to both end portions 20TA and 20TB of the rotor core 20 illustrated in FIGS. 15 and 16. The cooling structure 2b is configured such that the third cooling medium passage 43A or the like is connected to one of the fourth cooling medium passages 44A1 and 44A2 in the cooling structure 2 illustrated in FIGS. 16 and 17.

In the cooling structure 2b, the passage distance of cooling medium passages 40Ab and 40Bb is equal to the sum of the distance (supply passage distance) from the cooling medium inlet 11I to the inlet of the first cooling medium passages 41Ab and 41Bb, the length of the first cooling medium passages 41Ab and 41Bb the length of the second cooling medium passages 42Ab and 42Bb, the length of the third cooling medium passages 43Ab and 43Bb, and the length of the fourth cooling medium passages 44Ab and 44Bb. Like the above-described cooling structures 2 and 2a, the cooling structure 2b is configured such that the passage distances of the cooling medium passages 40Ab and 40Bb opened respectively both end portions of the rotor core 20 (the distances from the cooling medium inlet 11I to the respective ejection holes 40AHb and 40BHb) are equal. As a result, the cooling structure 2a can also suppress the cooling variation of the rotor core 20 and the coil end 6CE.

<First Modified Example of Cooling Structure>

Figure 20:
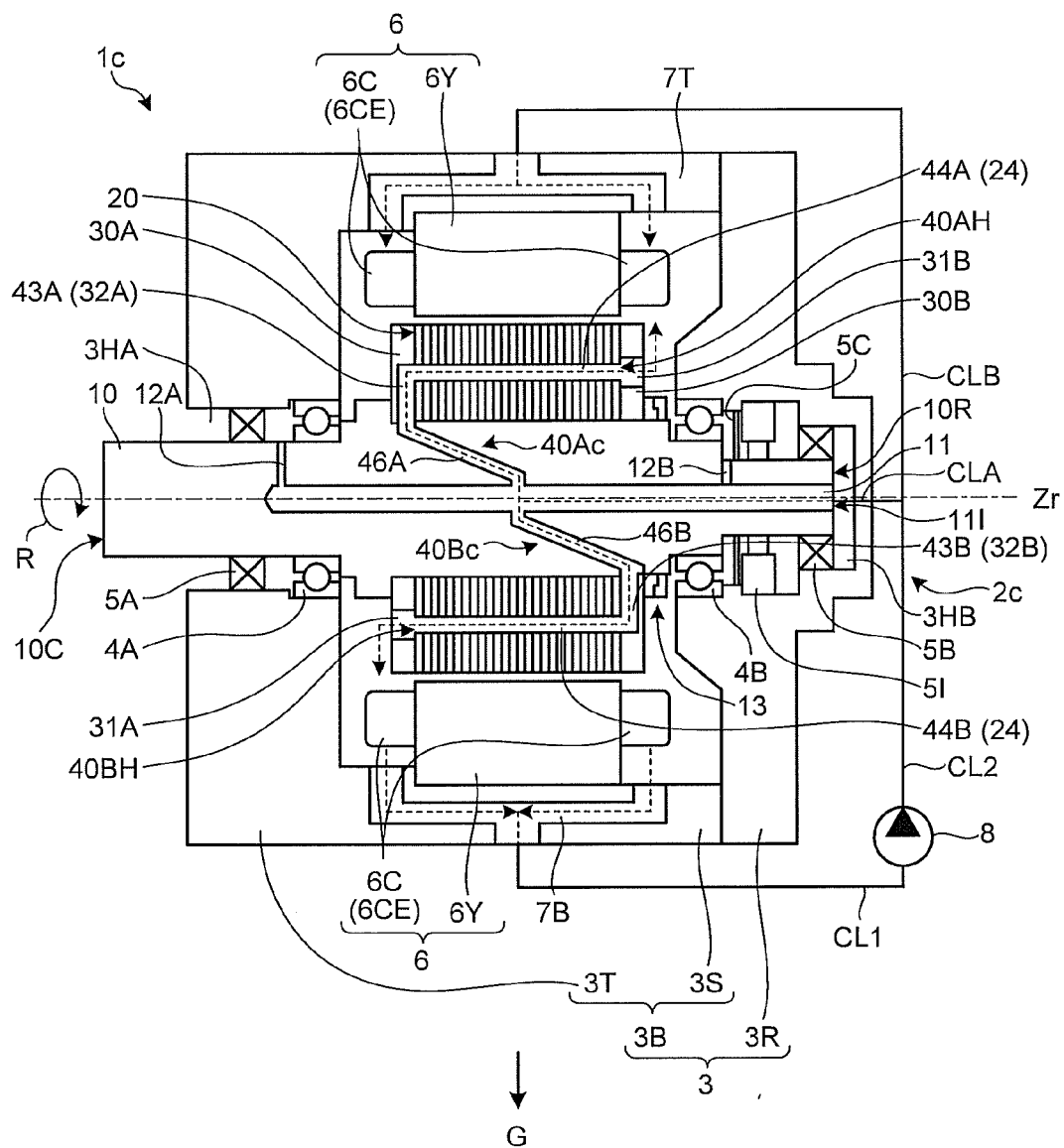
FIG. 20 is a cross-sectional view illustrating a motor cooling structure and a motor including the motor cooling structure according to a first modified example of the present embodiment.

FIG. 20 is a cross-sectional view illustrating a motor cooling structure and a motor including the motor cooling structure according to a first modified example of the present embodiment. A cooling structure 2c and a motor 1c of the first modified example are substantially the same as the above-described cooling structure 2 and the motor 1. However, the cooling structure 2c and the motor 1c are different from the cooling structure 2 and the motor 1 in terms of the configuration of cooling medium passages 40Ac and 40Bc branched from the cooling medium supply passage 11. The other configurations are the same as those of the above-described cooling structure 2 and the motor 1, and thus a description thereof will be omitted.

The cooling medium passages 40Ac and 40Bc include branch passages 46A and 46B that are branched from the cooling medium supply passage 11 and are connected to the third cooling medium passages 43A and 43B (connection portions 32A and 32B). The branch passage 46A extends slantly toward the radial outside of the shaft 10 and the one end portion 10C, and the branch passage 46B extends slantly toward the radial outside of the shaft 10 and the other end portion 10R. This structure can also suppress the cooling variation of the rotor core 20 and the coil end 6CE.

<Second Modified Example of Cooling Structure>

Figure 21:
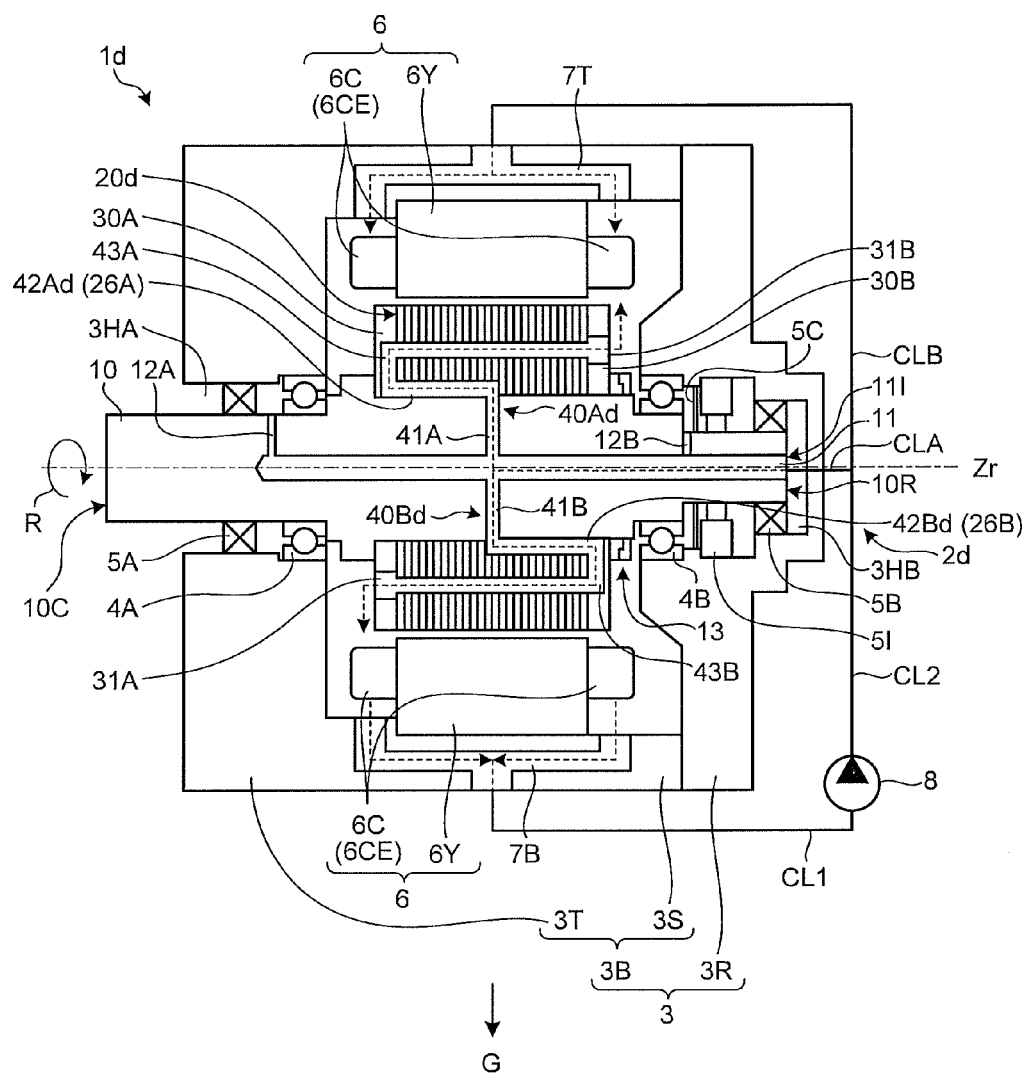
FIG. 21 is a cross-sectional view illustrating a motor cooling structure and a motor including the motor cooling structure according to a second modified example of the present embodiment.

FIG. 21 is a cross-sectional view illustrating a motor cooling structure and a motor including the motor cooling structure according to a second modified example of the present embodiment. A cooling structure 2d and a motor 1d of the second modified example are substantially the same as the above-described cooling structure 2 and the motor 1. However, the cooling structure 2d and the motor 1d are different from the cooling structure 2 and the motor 1 in that second cooling medium passages 42Ad and 42Bd included in cooling medium passages 40Ad and 40Bd are provided in a rotor core 20d. The other configurations are the same as those of the above-described cooling structure 2 and the motor 1, and thus a description thereof will be omitted.

A portion of the inner periphery of the rotor core 20d is removed from a portion at which the first cooling medium passages 41A and 41B are opened to the shaft 10, to the inlets of the third cooling medium passages 43A and 43B (connection portions 32A and 32B), toward the radial outside, thereby forming concave portions 26A and 26B. This portion becomes the second cooling medium passages 42Ad and 42Bd. Also, the second cooling medium passages 42Ad and 42Bd or the like may be formed in the rotor core 20d. The cooling structure 2d does not need to form grooves at the surface of the shaft 10 in order to form the second cooling medium passages 42Ad and 42Bd. This structure can also suppress the cooling variation of the rotor core 20 and the coil end 6CE.

As described above, when cooling the motor by the cooling medium, the present embodiment and the modified examples equalize the passage distances L of the plurality of cooling medium passages and do not branch the cooling medium into the cooling medium passage that is parallel to the shaft of the motor. Accordingly, the pressure losses of the respective cooling medium passages can be maintained to be substantially constant, and the flow rates of the cooling mediums passing through the respective cooling passages can be maintained to be substantially constant. As a result, the present embodiment and the modified examples can suppress the cooling variation of the rotor core and the coil (specifically, the coil end), and thus can suppress the performance of the motor. Also, the present embodiment and the modified examples can stably operate the motor. In addition, since the cooling medium is not branched into the cooling medium passage parallel to the shaft of the motor, even when the cooling medium receives a force in the direction parallel to the shaft, the flow rate variation of the cooling medium caused by the force can be reduced. As a result, even in the case of the motor that is subject to receive a force in the direction parallel to the shaft, the flow rate variation of the cooling mediums passing through the respective cooling passages can be reduced, so that the cooling variation of the rotor core and the coil (specifically, the coil end) can be suppressed.

REFERENCE SIGNS LIST 1, 1c, 1d motor
2, 2a, 2b, 2c, 2d motor cooling structure (cooling structure)
3 housing
3R opposite shaft extraction side member
3S side portion
3T shaft extraction side member
4A, 4B bearing
6 stator
6C coil
6CE coil end
6Y stator core
7B cooling medium recovery passage
7T coil end cooling passage
8 pump
10 shaft
10C one end portion
10R other end portion
11 cooling medium supply passage
11I cooling medium inlet
15A, 15B groove
20, 20d rotor core
20TA, 20TB end portion
21 steel plate
22 magnet holding hole
23 magnet
24 through hole
30A, 30B balance plate
31A, 31B cooling medium outlet
32A, 32B connection portion
40AH, 40BH, 40AH1, 40BH1, 40AHa, 40AHb ejection hole
40A, 40Ac, 40Ad, 40B, 40Bc, 40Bd cooling medium passage
41A, 41Aa, 41Ab, 41B, 41Ba, 41Bb first cooling medium passage
42A, 42Aa, 42Ab, 42Ad, 42B, 42Ba, 42Bb, 42Bd second cooling medium passage
43A, 43Ab, 43B, 43Bb third cooling medium passage
44A, 44A1, 44A2, 44Ab, 44B, 44B1, 44B2, 44Bb fourth cooling medium passage
46A, 46B branch passage
100 wheel loader

The invention claimed is:

1. A motor cooling structure for cooling a motor, which includes a shaft transmitting power and a rotor core attached to an outside of the shaft, by a cooling medium, comprising:
a cooling medium supply passage that extends to an inside of the shaft in an axial direction of the shaft and passes the cooling medium through the cooling medium supply passage; and
a plurality of separate cooling medium passages each of which is branched from the cooling medium supply passage to the rotor core while flowing the cooling medium without branching the cooling medium in the axial direction in order to cool the rotor core and ejects the cooling medium from one or more ejection holes from a plurality of ejection holes opened to a surface of the rotor core,
wherein each branch of each separate cooling medium passage from the cooling medium supply passage is further branched in a radial direction at one of two end portions of the rotor core, and leads to at least two separate cooling medium passage portions that pass through the rotor core in the axial direction and connect to different outlets in a balance plate at the other one of the two end portions of the rotor,
wherein two of the separate cooling medium passages are branched in the radial direction at a same one of the two end portions of the rotor core,
wherein distances from a cooling medium inlet, through which the cooling medium flows into the cooling medium supply passage, to the respective ejection holes are equal between the plurality of cooling medium passages, and
wherein the shaft includes a surface including a groove that extends in the axial direction,
a part of one of the separate cooling medium passages is formed between the groove and the rotor core, and
the groove formed at the surface of the shaft directly communicates with the cooling medium supply passage of the inside of the shaft through a hole in a radial direction.

2. The motor cooling structure according to claim 1, wherein
the ejection holes are opened to both end portions of the rotor core.

3. The motor cooling structure according to claim 1, wherein
an even number of the cooling medium passages are branched from the cooling medium supply passage.

4. The motor cooling structure according to claim 1, wherein
a position at which each of the plurality of cooling medium passages is branched from the cooling medium supply passage is a central portion of the rotor core in the axial direction.

5. The motor cooling structure according to claim 1, wherein
the plurality of cooling medium passages have an equal dimension and shape in a case where the cooling medium passages are cut along a plane that is parallel to a flow direction of the cooling medium.

6. The motor cooling structure according to claim 1, wherein the two separate cooling medium passage portions for the one of the separate cooling medium passages are each a through hole that passes through the rotor core in the axial direction, and the groove and the through holes of the one of the separate cooling medium passages are connected at one of two end portions of the rotor core.

7. The motor cooling structure according to claim 1, wherein the rotor core includes a magnet holding hole that passes through in the axial direction and holds a magnet.

8. The motor cooling structure according to claim 6, wherein the balance plate provided at one of two end portions of the rotor core includes a connection portion that connects the groove and the through holes of the one of the separate cooling medium passages.

9. The motor cooling structure according to claim 8, wherein each of the plurality of cooling medium passages includes:

a first cooling medium passage that is branched from the cooling medium supply passage to an outer side of the shaft in a radial direction;

a second cooling medium passage that is connected to the first cooling medium passage and extends in the axial direction; and the connection portion that is connected to the second cooling medium passage.

10. The motor cooling structure according to claim 1, wherein a housing that stores the shaft, to which the rotor core is attached, and a stator disposed at an outside of the rotor core includes a coil end cooling passage at a portion facing a coil end of a coil included in the stator.

11. The motor cooling structure according to claim 1, wherein the shaft includes two bearings that rotatably support the shaft, and the cooling medium supply passage includes:

a first cooling medium ejection passage opened to the curved surface of the shaft at a location adjacent a first bearing of the two bearings; and a second cooling medium ejection passage opened to the curved surface of the shaft at a location adjacent a second bearing of the two bearings.

12. A motor cooling structure for cooling a motor, which includes a shaft transmitting power and a rotor core attached to an outside of the shaft, by a cooling medium, comprising:

a cooling medium supply passage that extends to an inside of the shaft in an axial direction of the shaft; and a plurality of separate cooling medium passages extending from the cooling medium supply passage, wherein each of the separate cooling medium passages includes:

a first cooling medium passage that extends from the cooling medium supply passage to an outer side of the shaft in a radial direction at a position corresponding to a central portion of the rotor core in the axial direction, and is perpendicular to the cooling medium supply passage;

a second cooling medium passage that is formed by a space surrounded by the rotor core and a groove formed at a surface of the shaft and extending in the axial direction, wherein the space is connected to the first cooling medium passage and the second cooling medium passage directly communicates with the cooling medium supply passage of the inside of the shaft through the first cooling medium passage;

a third cooling medium passage that is provided in a first balance plate installed at a first end portion of the rotor core and is connected to the second cooling medium passage;

at least two fourth cooling medium passages that pass through the rotor core in the axial direction and connected to the third cooling medium passage; and a plurality of ejection holes to which each of the fourth cooling medium passages are opened at a respective end portion of the rotor core, each of the plurality of ejection holes being connected to a different outlet of a second balance plate at a second end portion that is opposite the first end portion of the rotor core, wherein the first balance plate installed at an end portion of the rotor includes the third cooling medium passage for two of the separate cooling medium passages, and wherein a distance from a cooling medium inlet, through which the cooling medium flows into the cooling medium supply passage, to the ejection hole of the cooling medium passage opened to one end portion of the rotor core is equal to a distance from the cooling medium inlet, through which the cooling medium flows into the cooling medium supply passage, to the ejection hole of the cooling medium passage opened to the other end portion of the rotor core.

13. A motor comprising a motor cooling structure for cooling the motor, which includes a shaft transmitting power and a rotor core attached to an outside of the shaft, by a cooling medium, comprising:

a cooling medium supply passage that extends to an inside of the shaft in an axial direction of the shaft and passes the cooling medium through the cooling medium supply passage; and a plurality of separate cooling medium passages each of which is branched from the cooling medium supply passage to the rotor core while flowing the cooling medium without branching the cooling medium in the axial direction in order to cool the rotor core and ejects the cooling medium from one or more ejection holes from a plurality of ejection holes opened to a surface of the rotor core, wherein each branch of each separate cooling medium passage from the cooling medium supply passage is further branched in a radial direction at one of two end portions of the rotor core, and leads to at least two cooling medium passage portions that pass through the rotor core in the axial direction and connect to different outlets in a balance plate at the other one of the two end portions of the rotor, wherein two of the separate cooling medium passages are branched in the radial direction at a same one of the two end portions of the rotor core, wherein distances from a cooling medium inlet, through which the cooling medium flows into the cooling medium supply passage, to the respective ejection holes are equal between the plurality of cooling medium passages, and wherein the shaft includes a surface including a groove that extends in the axial direction, a part of one of the separate cooling medium passages is formed between the groove and the rotor core, and the groove formed at the surface of the shaft directly communicates with the cooling medium supply passage of the inside of the shaft through a hole in a radial direction.

14. The motor cooling structure according to claim 11 further comprising:

a housing that stores the shaft, to which the rotor core is attached, and a stator disposed at an outside of the rotor core includes a coil end cooling passage at a portion facing a coil end of a coil included in the stator; and sealing members provided between the shaft and the housing to prevent leakage of the cooling medium and adapted to allow the cooling medium to lubricate the bearings.

15. The motor cooling structure according to claim 14, further comprising:

an oil seal provided between the bearing and the sealing members.

* * * * *